(12) United States Patent
Shibata

(10) Patent No.: US 8,922,629 B2
(45) Date of Patent: Dec. 30, 2014

(54) IMAGE PROCESSING APPARATUS, IMAGE PROCESSING METHOD, AND PROGRAM

(75) Inventor: Mitsuru Shibata, Tokyo (JP)

(73) Assignee: Sony Corporation (JP)

( * ) Notice: Subject to any disclaimer, the term of this patent is extended or adjusted under 35 U.S.C. 154(b) by 420 days.

(21) Appl. No.: 12/924,531

(22) Filed: Sep. 29, 2010

(65) Prior Publication Data

US 2011/0090323 A1    Apr. 21, 2011

(30) Foreign Application Priority Data

Oct. 20, 2009   (JP) ................ P2009-241237

(51) Int. Cl.
*H04N 13/04* (2006.01)
*H04N 13/00* (2006.01)

(52) U.S. Cl.
CPC ....... *H04N 13/0497* (2013.01); *H04N 13/0018* (2013.01)
USPC ................. 348/54; 348/E13.026

(58) Field of Classification Search
CPC ............................... H04N 13/0497
USPC ........................................ 348/42–60
See application file for complete search history.

(56) References Cited

U.S. PATENT DOCUMENTS

| 6,222,882 B1* | 4/2001 | Lee et al. .................. 375/240.16 |
| 6,268,880 B1* | 7/2001 | Uomori et al. ................... 348/47 |
| 2009/0142041 A1* | 6/2009 | Nagasawa et al. ............ 386/124 |

FOREIGN PATENT DOCUMENTS

| EP | 1968329 A2 | 9/2008 |
| JP | 2008-172342 A | 7/2008 |

OTHER PUBLICATIONS

European Search Report EP Application No. 10178217, dated Oct. 1, 2012.

* cited by examiner

*Primary Examiner* — Andy Rao
*Assistant Examiner* — Nguyen Truong
(74) *Attorney, Agent, or Firm* — Lerner, David, Littenberg, Krumholz & Mentlik, LLP

(57) ABSTRACT

An image processing apparatus includes a controller that selects, from multiple images photographed from different viewpoints, a set of images for three-dimensional image display. The controller determines whether or not amount-of-movement information corresponding to a parallax between the images is recorded as attribute information of the images. When the amount-of-movement information is recorded, the controller selects a combination of images having a parallax corresponding to a display size of a display section by using the recorded amount-of-movement information. When the amount-of-movement information is not recorded, the controller selects a combination of images having a parallax corresponding to the display size by determining an amount of movement through use of information resulting from determination of degrees of block matching between images divided into blocks and using information of the determined amount of movement.

13 Claims, 23 Drawing Sheets

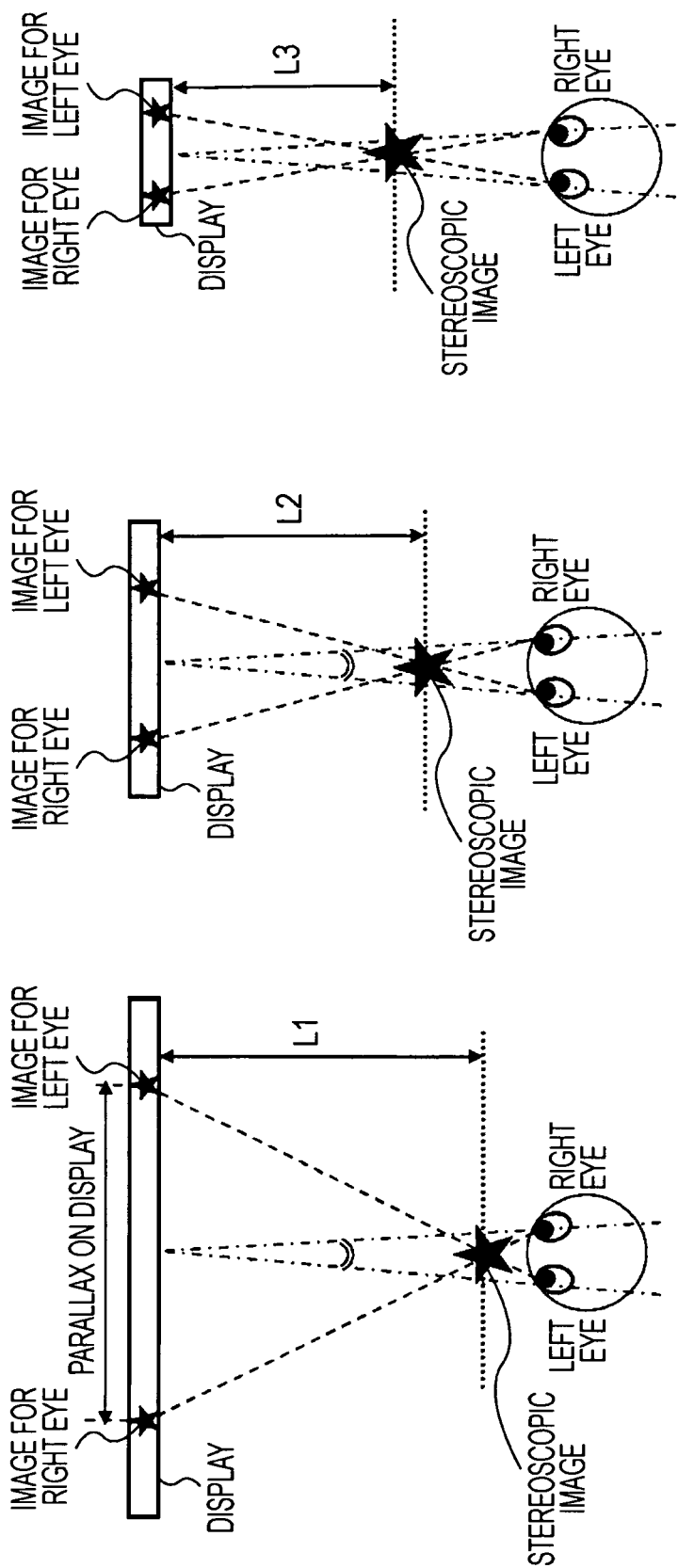

FIG. 10
 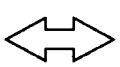
IMAGE 4
AMOUNT-OF-MOVEMENT INFORMATION (PARALLAX) = FOUR BLOCKS TO THE LEFT OF REFERENCE IMAGE
 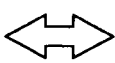
IMAGE 3
AMOUNT-OF-MOVEMENT INFORMATION (PARALLAX) = THREE BLOCKS TO THE LEFT OF REFERENCE IMAGE
 
IMAGE 2
AMOUNT-OF-MOVEMENT INFORMATION (PARALLAX) = TWO BLOCKS TO THE LEFT OF REFERENCE IMAGE
 
IMAGE 1 = REFERENCE IMAGE
AMOUNT-OF-MOVEMENT INFORMATION (PARALLAX) = 0
25
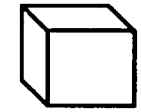
10

FIG. 16
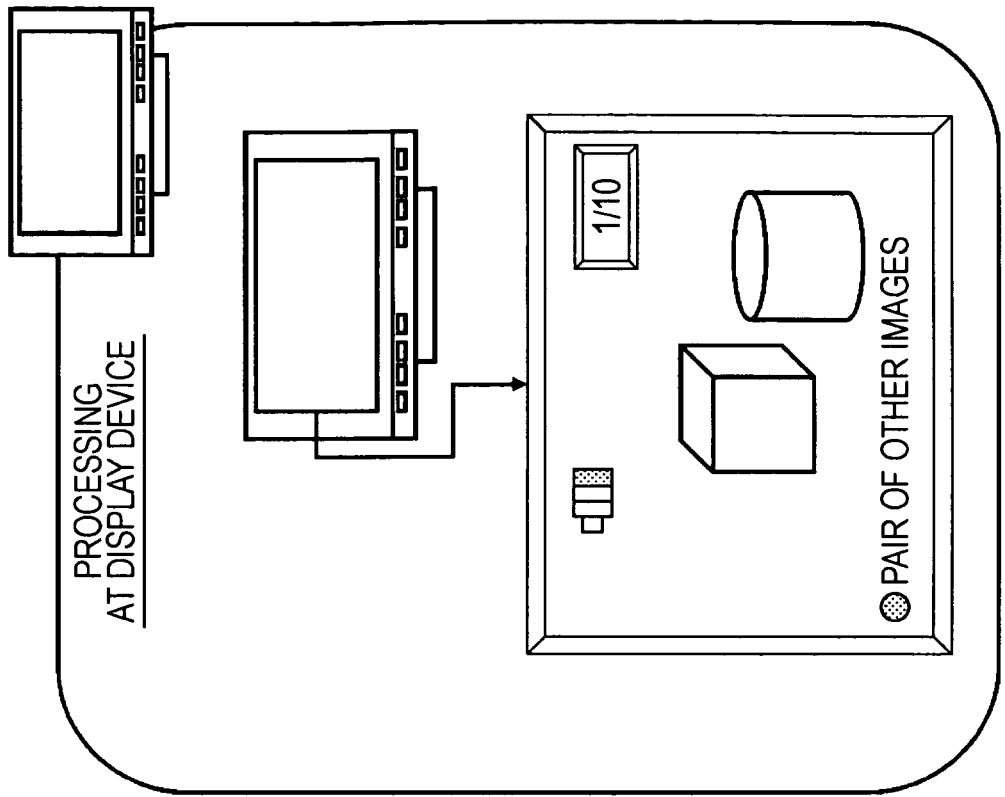
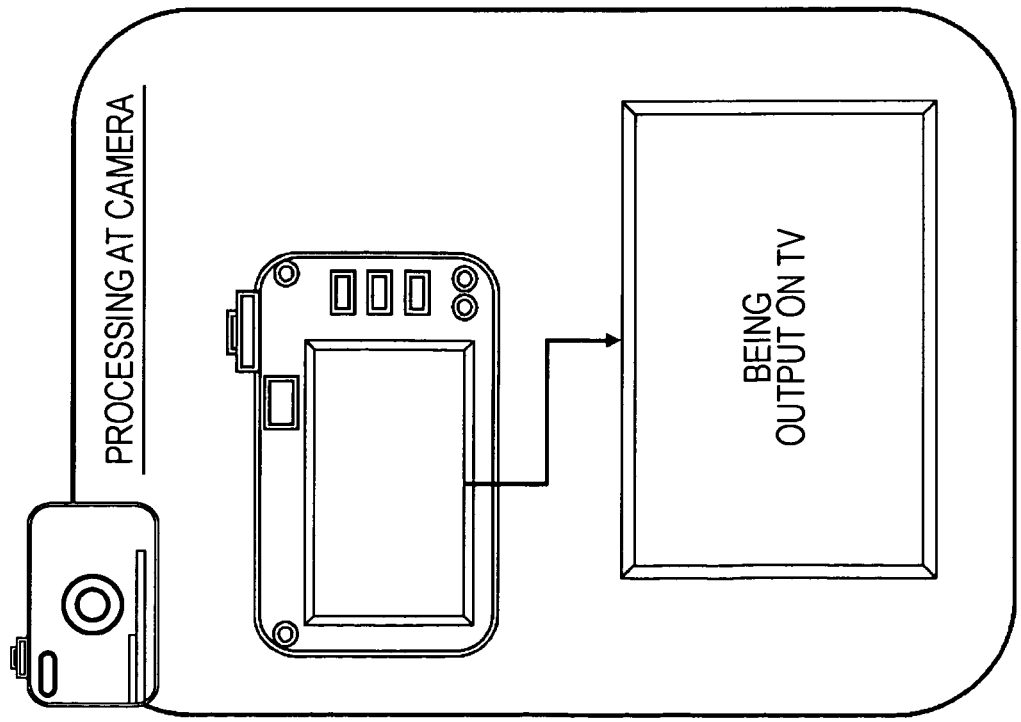

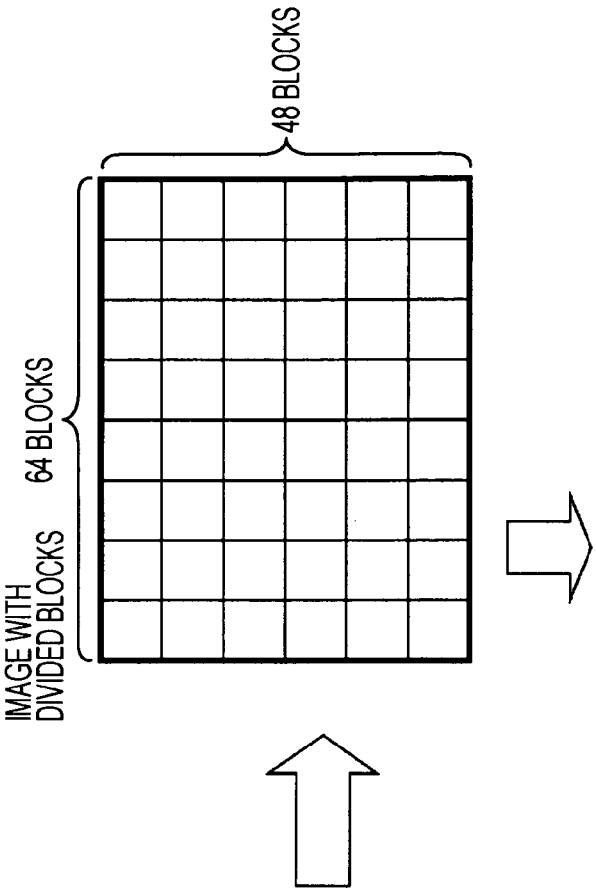
FIG. 23A
IMAGE
FIG. 23B
IMAGE WITH DIVIDED BLOCKS
48 BLOCKS
64 BLOCKS
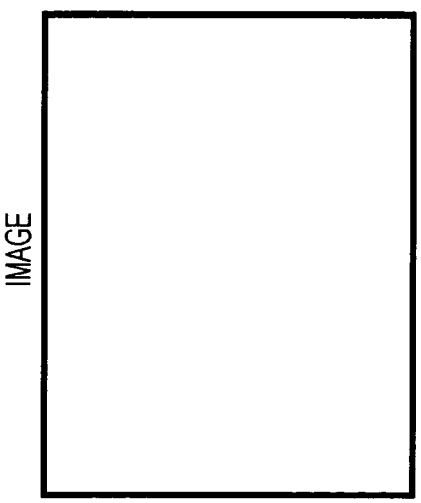
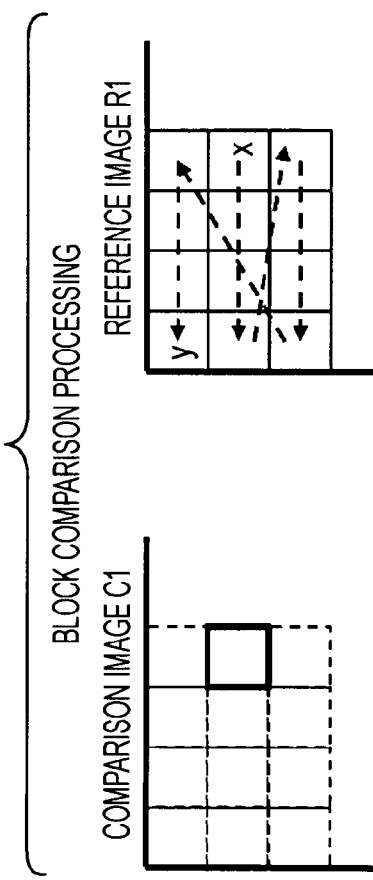
FIG. 23C
BLOCK COMPARISON PROCESSING
REFERENCE IMAGE R1
(EXAMPLE OF SEARCH PROCESSING USING LIMITED SEARCH RANGE)
COMPARISON IMAGE C1

IMAGE PROCESSING APPARATUS, IMAGE PROCESSING METHOD, AND PROGRAM

CROSS-REFERENCE TO RELATED APPLICATION

The present application claims priority from Japanese Patent Application No. JP 2009-241237 filed in the Japanese Patent Office on Oct. 20, 2009, the entire content of which is incorporated herein by reference.

BACKGROUND OF THE INVENTION

1. Field of the Invention

The present invention relates to image processing apparatuses, image processing methods, and programs. More specifically, the present invention relates to an image processing apparatus, an image processing method, and a program which perform processing for displaying a stereoscopic image, i.e., a three-dimensional (3D) image.

2. Description of the Related Art

In recent years, image capture apparatuses (cameras) for photographing images with multiple viewpoints have been developed which allow a stereoscopic image (a 3D image) to be displayed. Such an image capture apparatus photographs images with different viewpoints, for example, an image for the left eye and an image for the right eye.

For display of a three-dimensional image, an image for the left eye and an image for the right eye are displayed on a display section. A viewer wears liquid-crystal shutter glasses, polarized glasses, or the like to view the left-eye image and the right-image image with his or her left eye and right eye, respectively, so that he or she can view a three-dimensional image giving a stereoscopic effect. There are various three-dimensional-image display systems, such as a parallax barrier system that does use glasses, in addition to the aforementioned liquid-crystal shutter system and the polarized system.

In any of the systems, the viewer can get a sense of three dimensionality by individually viewing two images having a parallax with his or her left and right eyes. However, the position of an image seen by the viewer varies depending on the size of a display section on which two images photographed from different viewpoints are displayed.

This phenomenon will now be described with reference to FIGS. 1A to 1D. FIGS. 1A to 1C show, when the same pair of images (i.e., the same pair of an image for the left eye and an image for the right eye) is displayed on three different sizes of the display section (display), stereoscopic-image positions at which stereoscopic images of an object included in the display images are perceived.

FIGS. 1A, 1B, and 1C illustrate cases of a large-size display, a medium-size display, and a small-size display, respectively.

An example for the large-size display illustrated in FIG. 1A will be described first. As shown, the position of a stereoscopic image perceived by the viewer lies at the intersection of a line that connects the display position of the left-eye image on the display and the viewer's left eye and a line that connects the display position of the right-eye image on the display and the viewer's right eye. This is also true for the cases shown in FIGS. 1B and 1C.

As can be understood from FIGS. 1A to 1C, the larger the display size is, the larger the distance between the display position of the left-eye image on the display and the display position of the right-eye image on the display (i.e., the parallax on the display) becomes. Conversely, the smaller the display size is, the smaller the distance between the display position of the left-eye image on the display and the display position of the right-eye image on the display becomes.

As a result, as the display size increases, the position of a stereoscopic image perceived by the viewer relative to the display gets closer to the viewer. Thus, as shown in FIG. 1A, the amount of image pop-out, i.e., the distance of a stereoscopic image from the display, is L1.

For the medium-size display, the amount of image pop-out, i.e., the distance of a stereoscopic image from the display, is L2, as shown in FIG. 1B.

For the small-size display, the amount of image pop-out, i.e., the distance of a stereoscopic image from the display, is L3, as shown in FIG. 1C.

In such a manner, as the display size increases, a stereoscopic image looks more popped out to the viewer.

Thus, as illustrated in FIG. 1D, a relationship of L1>L2>L3 is satisfied, where L1 indicates the amount of image pop-out for the large-size display, L2 indicates the amount of image pop-out for the medium-size display, and L3 indicates the amount of image pop-out for the small-size display.

Long hours of continuous viewing of a stereoscopic image that has a large amount of image pop-out to appear closer to viewers, as in the case in FIG. 1A, may cause some people to experience eyestrain, headache, and so on. When the amount of stereoscopic-image pop-out is small as in the case in FIG. 1C, there is a problem in that the viewer does not get an adequate sense of three dimensionality.

Since long hours of continuous viewing of a stereoscopic image that has a large amount of stereoscopic-image pop-out to appear closer to viewers, as in the case in FIG. 1A, may adversely affect young people such as children who are still growing, a safety guide has been set [e.g., refer to 3DC (http://www.3dc.gr.jp/jp/index.html)].

Thus, for three-dimensional image display, images having an optimum parallax corresponding to the display size are used for display.

For display of a three dimensional image on a display, configurations that utilize images having a different parallax corresponding to the display size have been available. For example, Japanese Unexamined Patent Application Publication No. 2008-172342 discloses a configuration for providing images having an appropriate parallax corresponding to a display device.

In the configuration disclosed in Japanese Unexamined Patent Application Publication No. 2008-172342, multiple images having different parallaxes from different viewpoints are photographed in advance, the parallaxes between the images are determined through use of information of a specific pattern included in the images, and images having a parallax that is suitable for the display device are selected and used. The information of the specific pattern is, for example, a human face in the images, and the parallaxes between the multiple images are determined based on the area of the human face.

The method disclosed in Japanese Unexamined Patent Application Publication No. 2008-172342, however, involves processing for extracting the information of the specific pattern through image analysis to determine the parallaxes. Consequently, cost for processing increases, and only an image including the specific pattern, for example, a facial image, can be appropriately processed. Thus, when the information of the specific pattern is not detected from an image, there is a problem in that the image is not appropriately processed. The method disclosed in Japanese Unexamined Patent Application Publication No. 2008-172342 also has a problem in that no consideration is given to the aforementioned safety guideline.

SUMMARY OF THE INVENTION

The present invention has been conceived in view of the foregoing problems, and it is desirable to provide an image processing apparatus, an image processing method, and a program which can efficiently select and display images having an optimum parallax corresponding to a display section (a display) having any size.

According to a first embodiment of the present invention, there is provided an image processing apparatus. The image processing apparatus includes a controller that selects, from multiple images photographed from different viewpoints, display images to be used for processing for displaying a three-dimensional image. The controller is configured to execute processing for selecting, as the display images, a set of images having a different parallax in accordance with a display size of a display section. The controller determines whether or not amount-of-movement information corresponding to a parallax between the images is recorded as attribute information of the images. When the amount-of-movement information is recorded, the controller selects a combination of images having a parallax corresponding to the display size by using the recorded amount-of-movement information. When the amount-of-movement information is not recorded, the controller selects a combination of images having a parallax corresponding to the display size by determining an amount of movement through use of information resulting from determination of degrees of block matching between images divided into blocks and using information of the determined amount of movement.

According to the embodiment of the present invention, the image processing apparatus may further include a motion detector that executes processing for determining the degrees of the block matching between the images divided into the blocks. The controller determines the amount of movement by using information of detection performed by the motion detector.

According to the embodiment of the present invention, preferably, the controller obtains age information of a viewer, compares the obtained age information with a preset threshold age, and executes processing for selecting a combination of images having a parallax that differs between when the age of the viewer is less than the threshold age and when the age of the viewer is more than or equal to the threshold age.

According to the embodiment of the present invention, preferably, with respect to a display section having a large display size, the controller performs processing for selecting a combination of images having a smaller parallax than a parallax between images selected for a display section having a small display size.

According to the embodiment of the present invention, when the age of the viewer is less than the threshold age, the controller may perform processing for selecting a combination of images having a smaller parallax than a parallax selected when the age of the viewer is more than or equal to the threshold age.

According to the embodiment of the present invention, the controller may obtain the display size by analyzing display device information input from an external display device connected to the image processing apparatus.

According to the embodiment of the present invention, preferably, when the amount-of-movement information corresponding to the parallax between the images is not recorded as the attribute information of the images, the controller converts the images into images having luminance information and executes the block-matching-degree determination processing by using the images having the luminance information.

According to the embodiment of the present invention, the image processing apparatus may be an image capture apparatus having a function for photography images, and the controller may perform processing for recording, as attribute information of the photographed images, amount-of-movement information that is parallax information for the photographed images.

According to the embodiment of the present invention, the image processing apparatus may further include a motion detector that executes processing for determining the degrees of the block matching between the images divided into the blocks. The controller may determine the amount of movement by using information of detection performed by the motion detector and may record the determined amount of movement as the attribute information of the images.

According to a second embodiment of the present invention, there is provided an image processing method executed by an image processing apparatus. The method includes a step of causing a controller to select, from multiple images photographed from different viewpoints, display images to be used for processing for displaying a three-dimensional image. The image selecting step includes the steps of: executing processing for selecting, as the display images, a set of images having a different parallax in accordance with a display size of a display section; determining whether or not amount-of-movement information corresponding to a parallax between the images is recorded as attribute information of the images; selecting, when the amount-of-movement information is recorded, a combination of images having a parallax corresponding to the display size by using the recorded amount-of-movement information; and selecting, when the amount-of-movement information is not recorded, a combination of images having a parallax corresponding to the display size by determining an amount of movement through use of information resulting from determination of degrees of block matching between images divided into blocks and using information of the determined amount of movement.

According to a third embodiment of the present invention, there is provided a program for causing an image processing apparatus to execute image processing. The program includes a step of causing a controller to select, from multiple images photographed from different viewpoints, display images to be used for processing for displaying a three-dimensional image. The image selecting step includes the steps of: executing processing for selecting, as the display images, a set of images having a different parallax in accordance with a display size of a display section; determining whether or not amount-of-movement information corresponding to a parallax between the images is recorded as attribute information of the images; selecting, when the amount-of-movement information is recorded, a combination of images having a parallax corresponding to the display size by using the recorded amount-of-movement information; and selecting, when the amount-of-movement information is not recorded, a combination of images having a parallax corresponding to the display size by determining an amount of movement through use of information resulting from determination of degrees of block matching between images divided into blocks and using information of the determined amount of movement.

The program according to the embodiment of the present invention is, for example, a program that can be supplied to information processing apparatuses and computer systems capable of executing various program codes, through communication media and/or storage media supplied in a computer-readable format. The supply of the program in a computer-readable format allows the information processing apparatuses and computer systems to realize processing according to the program.

Further objects, features, and advantages of the present invention will become apparent from the following detailed description in conjunction with embodiments of the present invention and accompanying drawings. The term "computer system" as used herein refers to a logical collection of multiple apparatuses (devices) and is not limited to an architecture in which apparatuses (devices) having individual configurations are provided in a single housing.

In the apparatus and the method according to the embodiments of the present invention, images having an optimum parallax corresponding to the display size and the age of a viewer are selected during display of a three-dimensional image. In the configuration in which a set of images having a parallax therebetween, i.e., an image for the left eye and an image for the right eye, is output on the display section for display of a three-dimensional image, images corresponding to the display size of the display section and the age of the viewer are selected and output. When the display size of the display section is large, a set of images having a small parallax is selected as display images, and when the display size of the display section is small, a set of images having a relatively large parallax is selected as display images. In addition, when the age of the viewer is less than the preset threshold age, for example, 7 hears old, images having a relatively small parallax are selected as display images and the selected images are subjected to display processing. This arrangement can achieve an optimum stereoscopic-image display corresponding to the display device and the viewer.

BRIEF DESCRIPTION OF THE DRAWINGS

FIGS. 1A to 1D illustrate how a stereoscopic image is seen depending on a difference in display size;

FIG. 10 illustrates amount-of-movement recording processing executed by the image processing apparatus (the image capture apparatus) according to one embodiment of the present invention;

FIG. 16 illustrates an example of screens when the image processing apparatus (the image capture apparatus) according to one embodiment of the present invention executes display on an external display device;

FIGS. 23A to 23C illustrate division of an image into blocks and processing for determining an amount of movement.

DESCRIPTION OF THE PREFERRED EMBODIMENTS

An image to processing apparatus, an image processing method, and a program according to embodiments of the present invention will be described below in detail with reference to the accompanying drawings. A description below is given in the following sequence:

1. Example of Configuration of Image Processing Apparatus
2. Image Photography and Recording Processing at Image Capture Apparatus
3. Playback Processing of Photographed Image
4. Example of Image Output Processing corresponding to Function of Connected Display Device
5. Embodiment of Amount-of-Movement Determination through Image Comparison Processing

[1. Example of Configuration of Image Processing Apparatus]

An image processing apparatus according to one embodiment of the present invention selects images for three-dimensional image display from multiple images photographed from different viewpoints. In addition, during the image-selection processing, the image processing apparatus performs processing for selecting optimum images in accordance with, for example, a display-section configuration, such as the size of a display section, and the age of a viewer. The image processing apparatus according to the embodiment of the present invention may be an apparatus (e.g., a television (TV) set or a personal computer (PC)) having a display section or an image capture apparatus having a photography function. The image capture apparatus is connected to, for example, an external display device having an arbitrary size via an output section for the display device, outputs photographed images thereto, and performs processing for displaying a three-dimensional image.

Figure 2A:
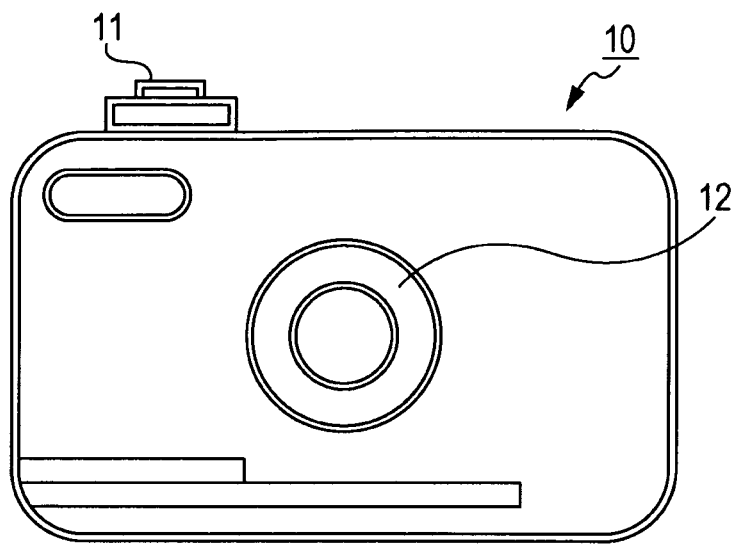
FIGS. 2A and 2B are schematic views illustrating an example of the external configuration of an image processing apparatus (an image capture apparatus) according to one embodiment of the present invention.
Figure 2B:
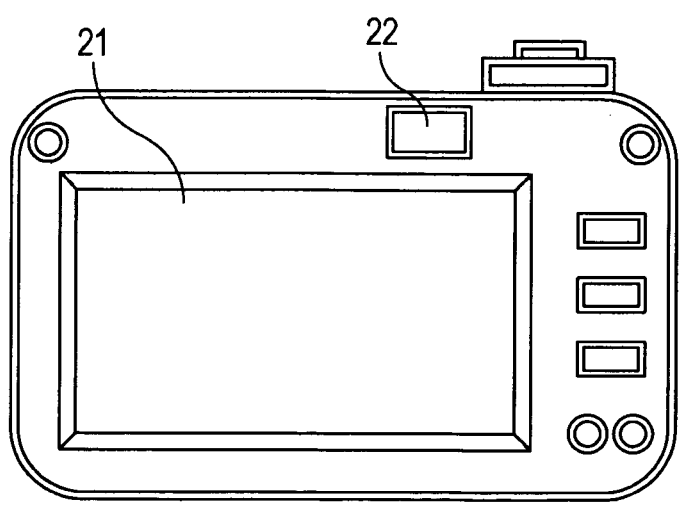

The image processing apparatus according to one embodiment of the present invention will be described below in conjunction with an example of an image capture apparatus with reference to FIGS. 2A and 2B. FIGS. 2A and 2B are external views of an image capture apparatus 10. FIG. 2A is a front view of the image capture apparatus 10 and FIG. 2B is a back view thereof. Upon operation of a shutter 11 shown in FIG. 2A, the image capture apparatus 10 captures an image via a lens 12.

As shown in the back view in FIG. 2B, the back surface of the image capture apparatus 10 has a display section (a monitor) 21 for displaying an image obtained via the lens 12 of the image capture apparatus 10. The display section 21 is used not only for displaying a preview screen for an image obtained via the lens 12 but also for displaying an image photographed and recorded in a memory, menus and manuals for operation, and so on.

The back surface of the image capture apparatus 10 further has an electronic view finder (EVF) 22, which is a view finder through which the user looks during photography. The user selectively uses the display section 21 or the EVF 22 to check a subject image during determination of a photographic angle or the like and operates the shutter 11 to perform photography.

Figure 3:
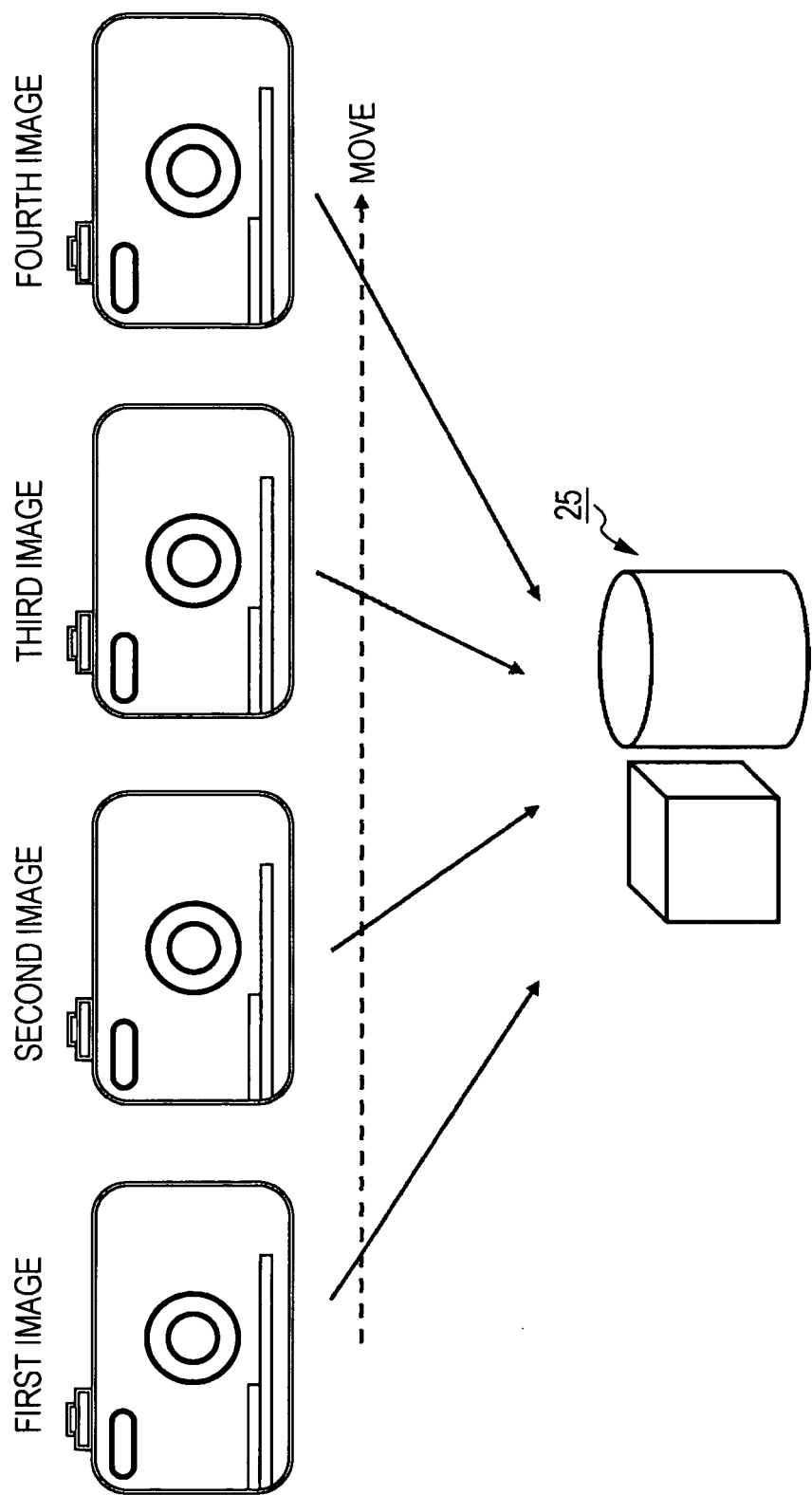
FIG. 3 illustrates a configuration in which the image processing apparatus (the image capture apparatus) according to one embodiment of the present invention performs processing for photographing images from different viewpoints.

Although the exemplary image capture apparatus 10 shown in FIGS. 2A and 2B has an external appearance that is similar to a typical camera, images photographed from different viewpoints are used to perform third-dimensional image display processing according to the present invention. An example of processing for obtaining images photographed from different viewpoints will now be described with reference to FIG. 3. As shown in FIG. 3, multiple images are sequentially photographed as a photography position is sequentially changed relative to a subject 25. As a result of this processing, images with different viewpoints can be photographed. The images are not limited to images obtained for display of a three-dimensional image and may be, for example, a collection of images for creating a panoramic image.

Figure 4:
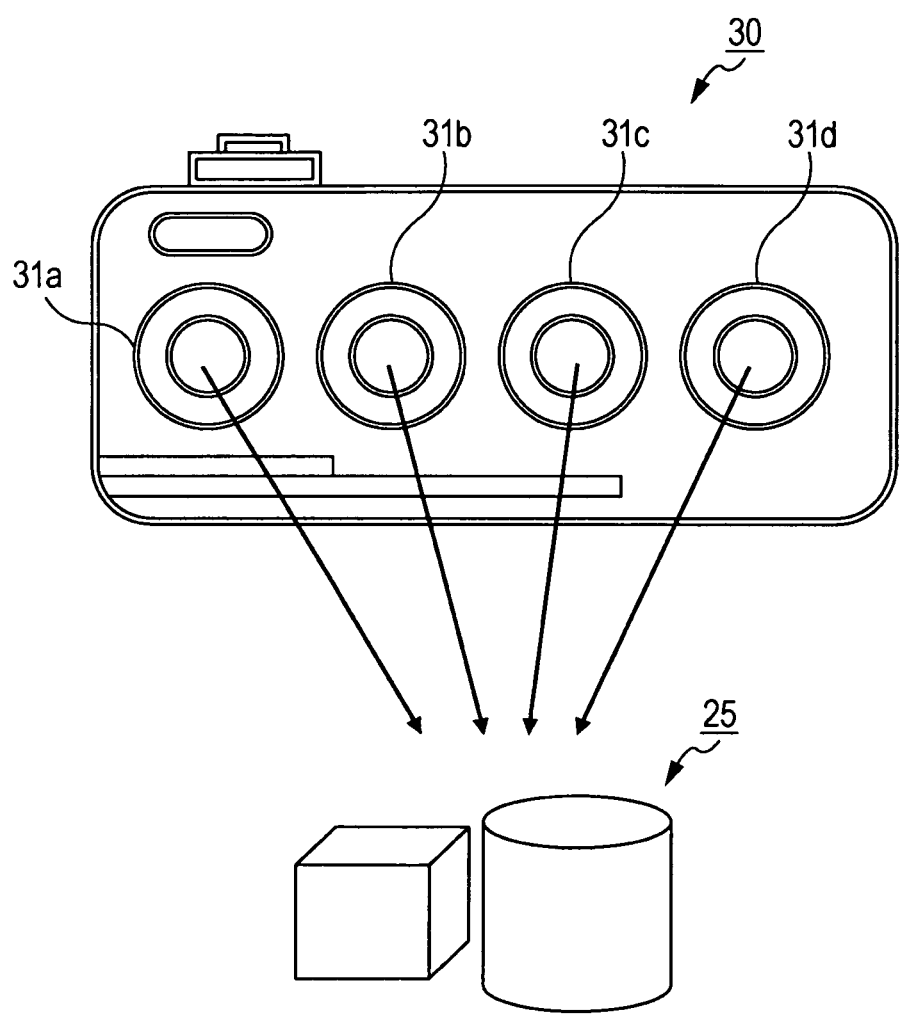
FIG. 4 is a schematic view illustrating a configuration in which an image processing apparatus (an image capture apparatus) according to one embodiment of the present invention performs processing for photographing images from different viewpoints.

Although examples of the image capture apparatus described with reference to FIGS. 2A, 2B, and 3 are directed to a configuration for photographing one image via a single lens section at a time, for example, use of a multi-view camera that can perform photography from multiple viewpoints, as shown in FIG. 4, makes it possible to photograph images with different viewpoints at a time. The image processing apparatus (the image capture apparatus) according to the embodiment of the present invention may be implemented by such a multi-view camera.

An image-capture apparatus 30 shown in FIG. 4 has four lens sections 31a to 31d at the front surface of the camera. The image-capture apparatus 30 photographs images with four different viewpoints via the four lens sections 31a to 31d at a time. Although the four lenses sections 31a to 31d are provided in the example shown in FIG. 4, a camera having any number of lenses, for example, a multi-view camera having two lens sections, can be used.

Thus, the image processing apparatus according to the embodiment of the present invention may be an image capture apparatus having one lens section or may be an image capture apparatus having multiple lens sections. The image processing apparatus may also be an apparatus (such as a PC) that has a display processing function and that has no photography function. For example, in the case of a PC or the like, images photographed from different viewpoints are input thereto from a storage section, such as a hard disk, or externally input through a network, a cable, or the like and are subjected to processing. The processing in this case refers to, for example, image-selection processing for displaying an optimum three-dimensional image corresponding to the configuration of the display section or the like.

Next, an example of the internal configuration of the image capture apparatus 10, which is one example of the image processing apparatus according to the embodiment of the present invention, will be described with reference to FIG. 5. The image capture apparatus according to the embodiment of the present invention includes a lens section 111, a photoelectric converter 112, and a signal processor 113. A subject image is input to the lens section 111. The photoelectric converter 112 has an image capture element for converting an optical signal, input via the lens section 111, into an electrical signal. Upon input of the electrical signal generated by the photoelectric converter 112, the signal processor 113 executes signal processing. As described above with reference to FIGS. 2A to 4, the lens section 111 may have a single-lens configuration and a multi-lens configuration.

The signal processor 113 executes various types of signal processing, such as white-balance adjustment processing, γ correction processing, and interpolation processing. On the basis of the result of the processing performed by the signal processor 113, a controller (CPU: central processing unit) 117 creates, for example, a multi-picture (MP) file in accordance with an MP format and generates data for stereoscopic-image display in accordance with a DCF (Design rule for Camera File system).

An image resulting from the processing performed by the signal processor 113 is displayed on a display section (a monitor) 121 or an EVF (electronic view finder) 122. During photography, the image is also stored in a storage section 115 or an external memory 116.

Figure 6:
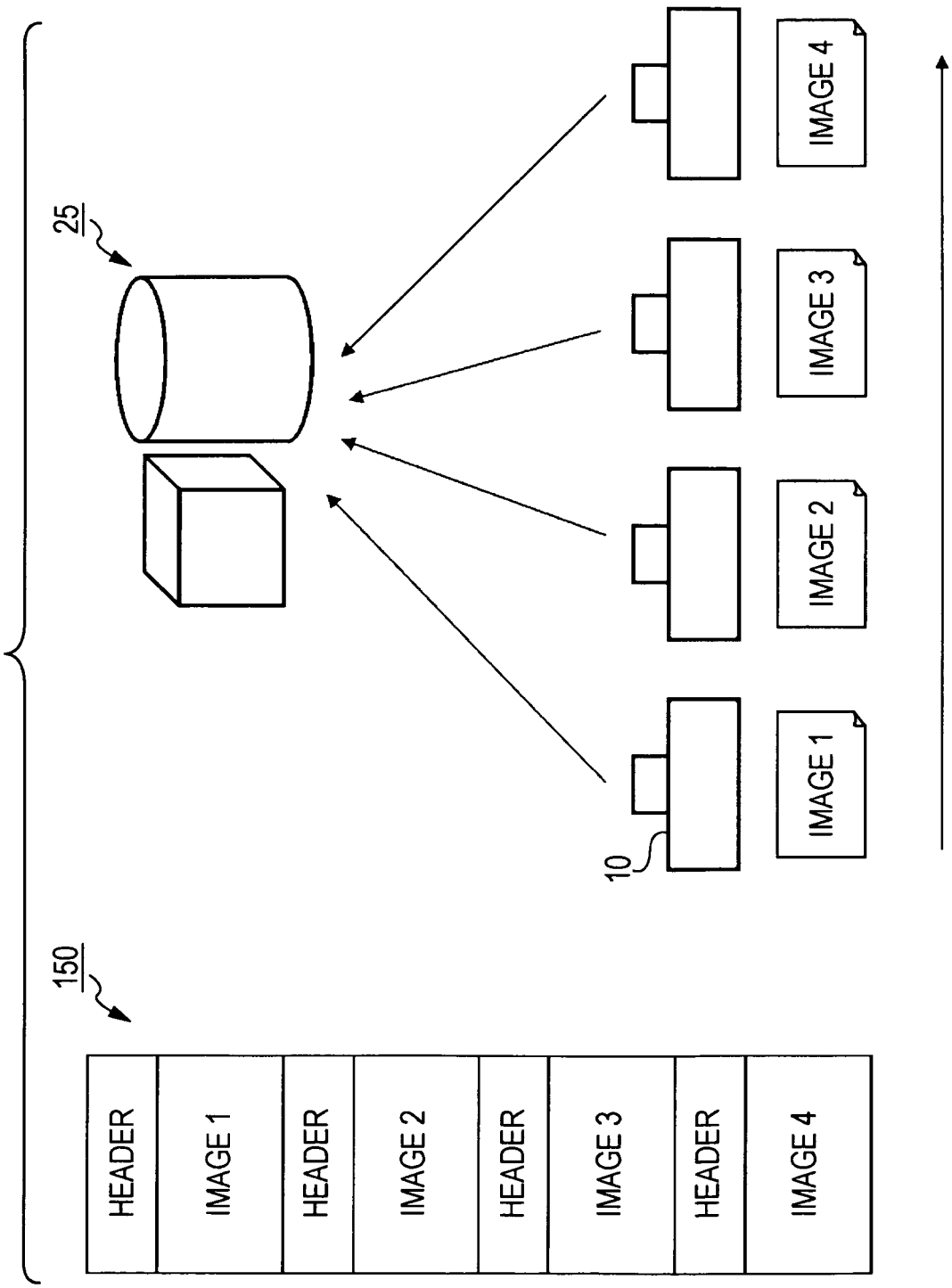
FIG. 6 illustrates an MP (multi-picture) file, which contains data recorded by the image processing apparatus (the image capture apparatus) according to one embodiment of the present invention.

An example of the structure of an MP file stored in the storage section 115 or the external memory 116 will now be described with reference to FIGS. 6 and 7. FIG. 6 is a diagram showing one example of the structure of an MP file 150 when multiple images 1 to 4 are photographed from different viewpoints as the image capture apparatus 10 is moved from left to right relative to the subject 25.

As shown in FIG. 6, the MP file 150 has, as record data for each image, a set of header information for the image and image data therefor. A header in FIG. 6 indicates header information for each image and contains various types of information for the image. An example of the structure of the header will now be described with reference to FIG. 7.

Figure 7:
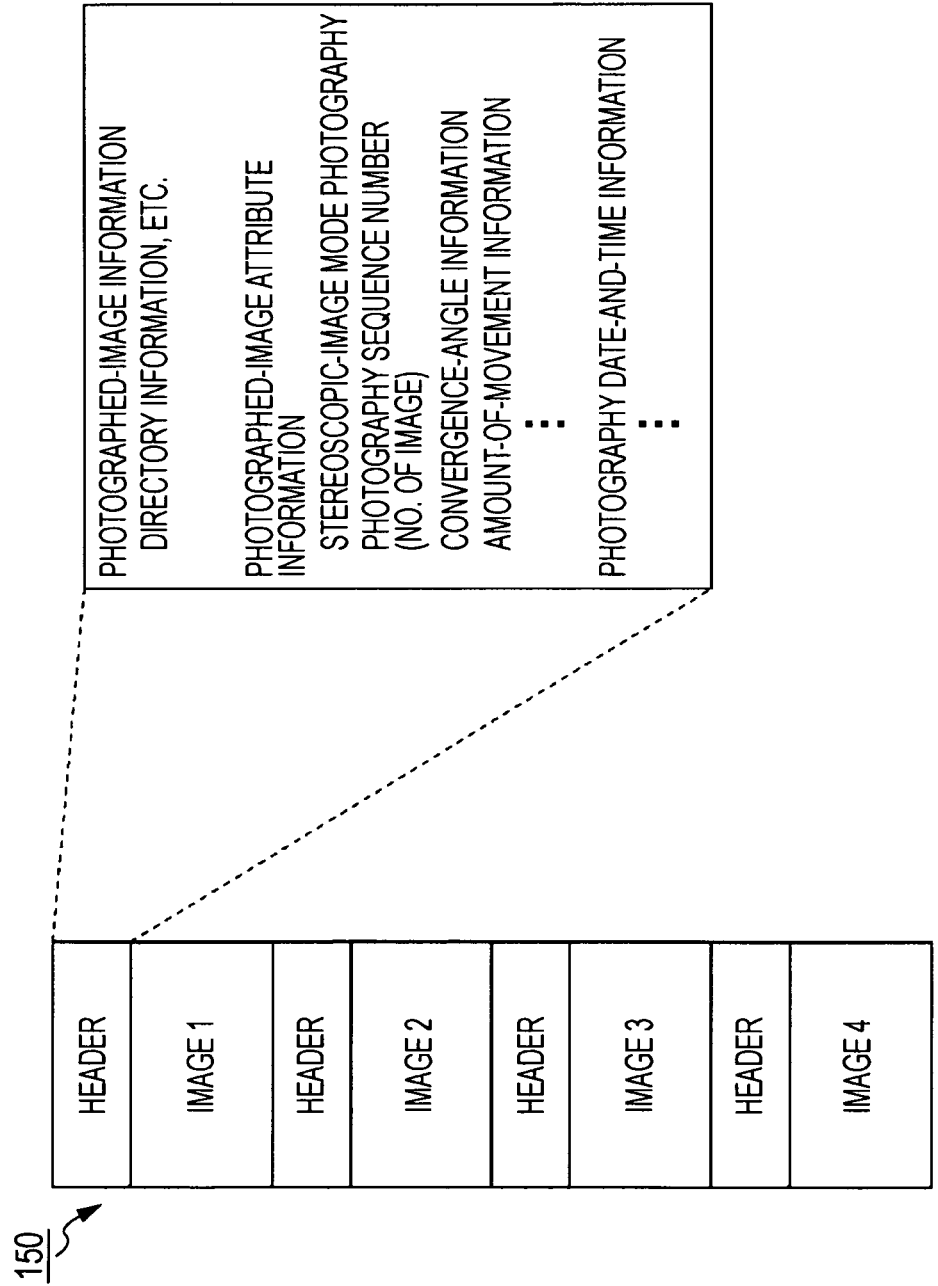
FIG. 7 illustrates the MP file, which contains data recorded by the image processing apparatus (the image capture apparatus) according to one embodiment of the present invention.

As shown in FIG. 7, examples of information contained in the header include:

(a) photography image information, such as directory information in which an image is recorded;

(b) photographed-image attribute information, such as
photography mode information indicating, for example, a stereoscopic-image mode or a panoramic-image mode,
a photography sequence number (an image serial number indicating the number of an image from a reference image (a first image)),
convergence-angle information, and
amount-of-movement information; and (c) photography date-and-time information.

These pieces of header information are exemplary and may contain any other information or may contain some pieces of the information.

Figure 8:
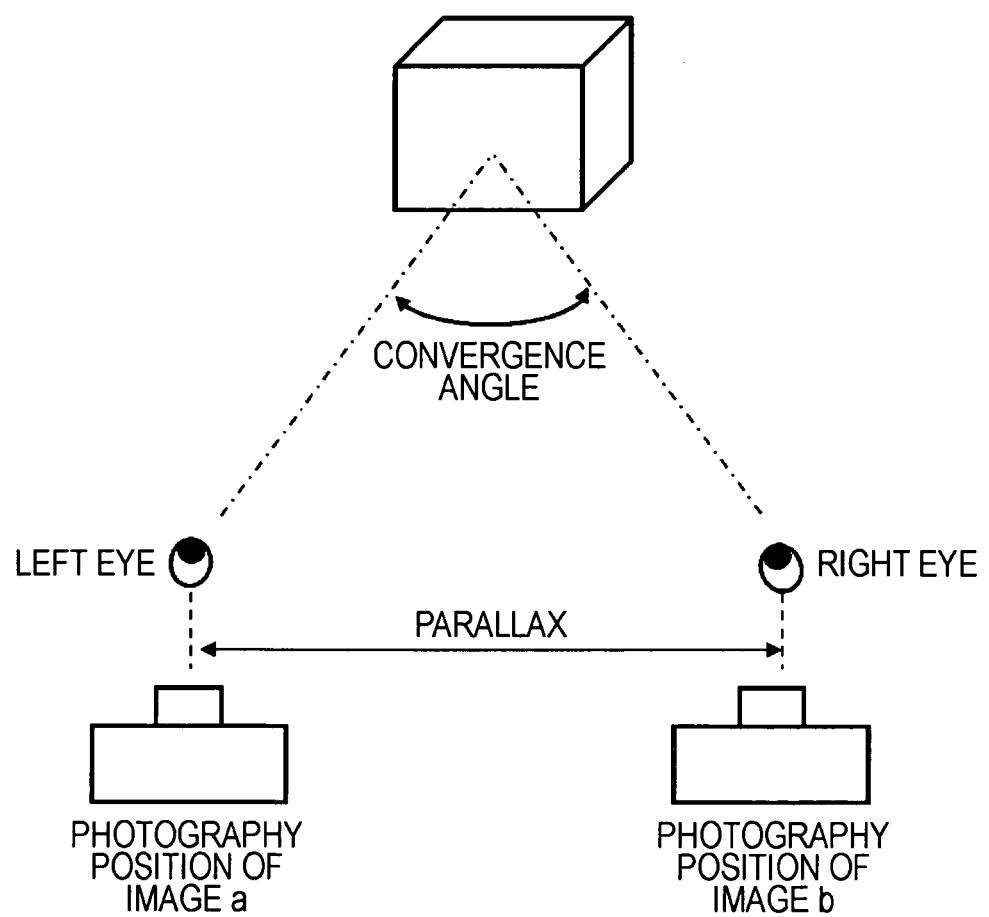
FIG. 8 illustrates a convergence angle and a parallax.

A convergence angle will now be described with reference to FIG. 8. As shown in FIG. 8, a convergence angle is an angle defined by lines connecting a subject and photography viewpoints. The distance of movement of a photography position corresponds to a parallax (the amount of camera movement).

For example, in the case of the multi-view camera described above with reference to FIG. 4, those pieces of information may be recorded as fixed values corresponding to the lens arrangement.

However, when the user moves and performs photography from different viewpoints, as described with reference to FIG. 3, those pieces of information are determined and recorded through photographed-image analysis. This processing is performed using motion detection processing of a motion detector 131 shown in FIG. 5. Details of the processing are described below.

Image data may be stored in a unique stereoscopic-image format employing an Exif (exchangeable image file) maker note so as to be usable for equipment that does not support the MP format. Instead of the Exif, image data may also be recorded through creation of a database including the header information described above with reference to FIG. 7 and having a format that satisfies the DCF standard.

The convergence-angle information and the amount-of-movement information are used for selection of two optimum images corresponding to the size of the display section or the like.

Although the MP-file header information shown in FIG. 7 is an example in which the convergence-angle information and the amount-of-movement information are recorded in association with each image, these pieces of information can also be determined by analyzing photographed images. That is, during recording of images, the image attribute information does not necessarily have to be recorded. Thus, for example, during selection of images to be displayed, image analysis may be executed to determine those values.

The configuration of the image capture apparatus will further be described with reference back to FIG. 5. An operation section 114 includes, for example, a shutter, a focus adjusting section, and a mode switching section. Upon operation of the shutter, the image capture apparatus photographs an image.

As described above, the storage section 115 and the external memory 116 are used as storage sections for photographed images. The storage section 115 and the external memory 116 are also used as areas for storing information, such as control programs and various parameters.

The controller 117 controls processing executed by the image capture apparatus. Examples of the processing include photography processing, image display processing for the display section 121 and the EVF 122, and so on. The controller 117 receives, for example, information of the display section 121 and information of an external display device 135 connected via an input/output section 132, and performs processing for selecting images having an optimum parallax corresponding to the size of the external display device 135 or the like. Details of the processing are described below. A program used for the control executed by the controller 117 is stored in, for example, a ROM (read only memory) 118. The controller 117 executes various types of processing in accordance with the program.

A RAM (random access memory) 119 is used as a work area for processing executed by the controller 117 and is also used as a storage area for various types of setting information. The RAM 119 is also used as a temporary storage area for images and various data. For execution of the program stored in the ROM 118, the controller 117 loads the program into the RAM 119 and performs processing in accordance with the loaded program.

A display section (monitor) 121 corresponds to the display section (monitor) 21 shown in FIG. 2B. The display section 121 is implemented by, for example, a liquid-crystal display device. The display section 121 displays an image (a preview image) obtained via the lens section 111. The display section 121 is also used to display photographed images read from the storage section 115 or the external memory 116. In addition, the display section 121 also displays a menu screen, an operation screen, and so on. The display section 121 may also be configured so as to function as, for example, a user input section having a touch-panel function.

The display section 121 may have, for example, a configuration that is capable of switching between a stereoscopic image (a 3D image) and a flat image (a 2D image) for display. The display section 121 has, for example, a display configuration including a polarizer or a lenticular (a prism sheet) or a display configuration using a parallax barrier, such as an image splitter, so that a stereoscopic image can be seen with the naked eyes.

The EVF 122 corresponds to the EVF 22 shown in FIG. 2B. The EVF 122 is implemented by, for example, a liquid-crystal display device. Upon operation of an EVF switching section implemented by the input/output section 132, the EVF 122 displays an image (a preview image) obtained via the lens section 111.

The user can selectively use the display section 121 or the EVF 122 to check a subject image during determination of a photographic angle or the like and can operate the shutter 11 to perform photography.

A power supply 123 is a section for supplying power to the image capture apparatus and is implemented by, for example, a battery.

As described above, the motion detector 131 executes image motion-detection processing by analyzing images photographed from different viewpoints. The controller 117 determines a convergence angle and a camera movement distance (a parallax) on the basis of a result of the image motion-detection processing and records the convergence angle and the camera movement distance (the parallax) to the storage section or the like as attribute information (included in the header or the like) for the images.

Figure 9:
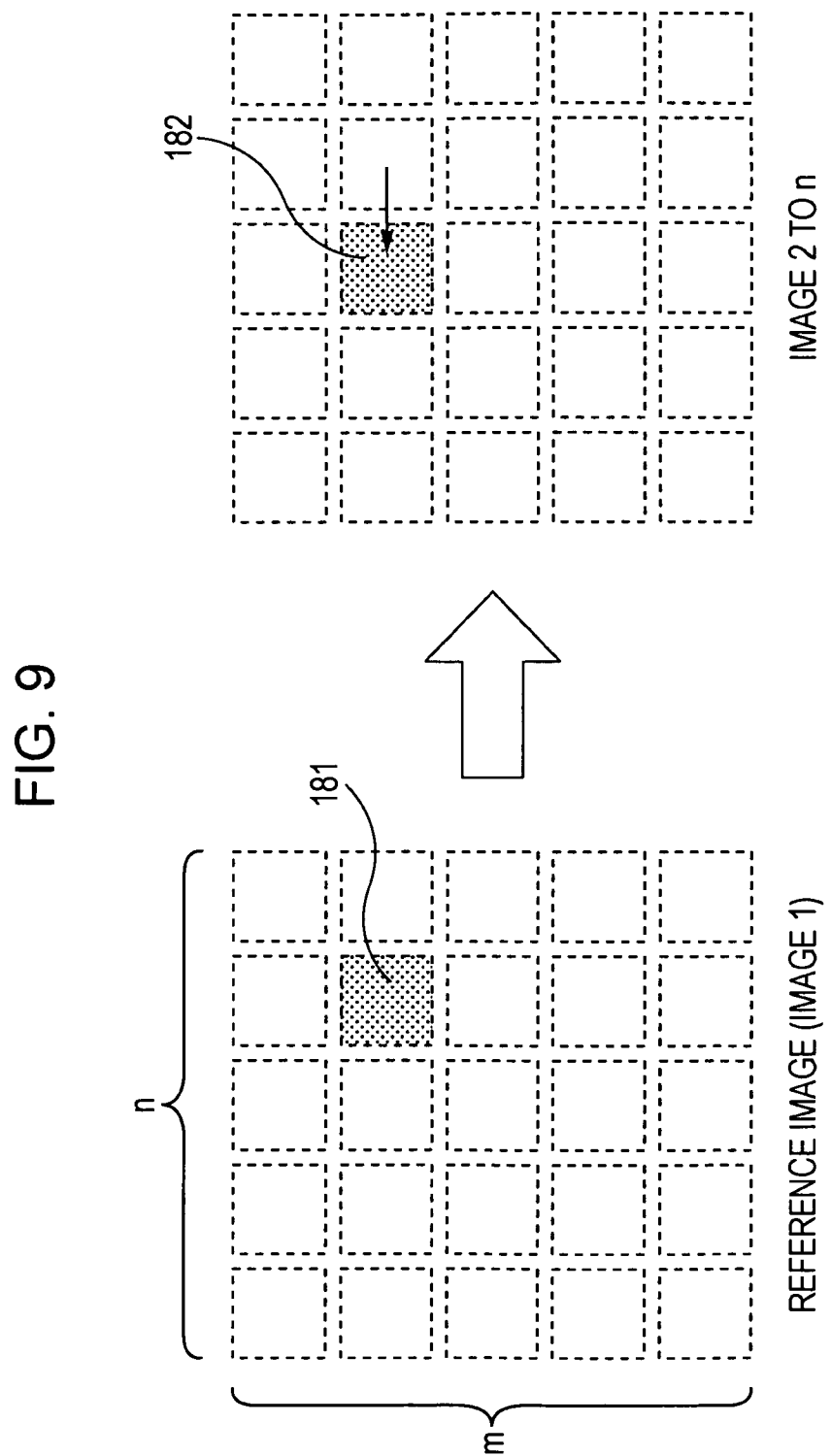
FIG. 9 illustrates amount-of-movement determination processing executed by the image processing apparatus (the image capture apparatus) according to one embodiment of the present invention.

The motion-detection processing executed by the motion detector 131 will now be described with reference to FIGS. 9 and 10. FIG. 9 shows images 1 and 2 sequentially photographed from different viewpoints. The images 1 and 2 can be photographed, for example, as the image capture apparatus (camera) 10 is moved from left to right, as shown in FIG. 10.

The image 1 has image data photographed before the image 2. The image data of the images 1 and 2 are temporarily stored in the RAM 119 (see FIG. 5). The motion detector 131 compares these pieces of image data. To perform comparison, the motion detector 131 divides each piece of image data into blocks. As shown in FIG. 9, the motion detector 131 divides each piece of image data into, n (horizontal) blocks×m (vertical) blocks.

The motion detector 131 determines a similarity between the n×m blocks of the images 1 and 2 to obtain a movement distance (a parallax) between the image 1 and the image 2. The example shown in FIG. 9 corresponds to, for example, a case in which a block 181 in the image 1 is selected for the processing. The motion detector 131 selects, in the image 2, a block that is similar to the block 181 in the image 1. The motion detector 131 determines a similarity between the blocks on the basis of, for example, a similarity in luminance distribution. As a result of this determination processing, a block 182 in the image 2 is selected as shown in FIG. 9. In this case, the movement distance (parallax) of the image 2 relative to the image 1 is one block.

Thus, the motion detector 131 obtains a movement distance between a preceding photographed image and a subsequent photographed image by performing block matching. The controller 117 receives a result of the block matching from the motion detector 131, determines an amount of movement on the basis of the received result, and records the amount of movement as attribute information of the corresponding image. For example, when four images are sequentially photographed as shown in FIG. 10, the controller 117 records, as amount-of-movement information in the attribute information of each image, the amount and the direction of block movement relative to the preceding image.

The input/output section 132 is connected to the external display device 135 to output, for example, image data for three-dimensional image display. More specifically, the input/output section 132 includes, for example, a network connection section for connection with a network such as a LAN (local area network) or a WAN (wide-area network), a video digital-to-analog converter section connected to an external display device (such as a TV) through a component or a composite, and a transmitter with CEC (consumer electronic control) connected to the external display device (such as a TV) through an HDMI (high-definition multimedia interface). Display device information, such as a size, transmitted from the external display device 135 is input to the input/output section 132. The input/output section 132 outputs the display device information to the controller 117. Upon input of the information, the controller 117 performs processing for selecting images having a parallax that is optimum for the external display device 135. Details of the processing are described below.

[2. Image Photography and Recording Processing at Image Capture Apparatus]

Figure 11:
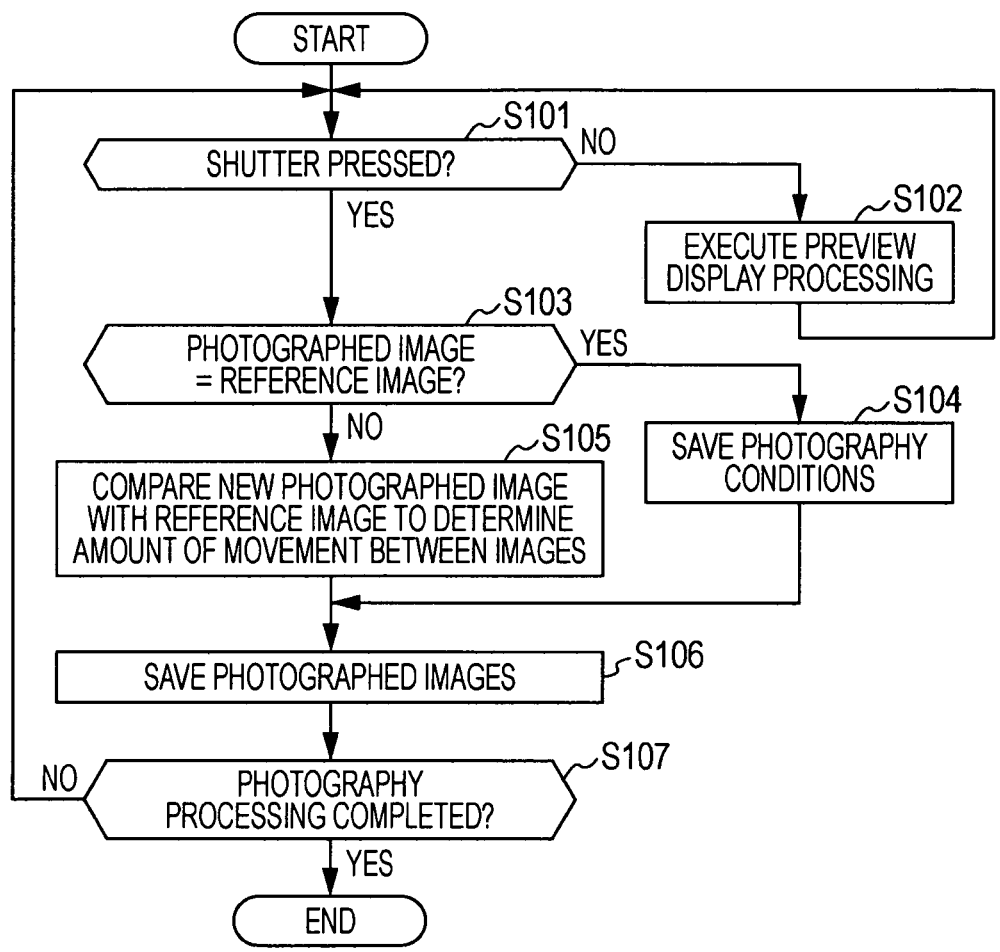
FIG. 11 is a flowchart illustrating a sequence of image-recording processing executed by the image processing apparatus (the image capture apparatus) according to one embodiment of the present invention.

The image photography and recording processing executed by the image capture apparatus will be described next. FIG. 11 is a flowchart showing an overall sequence of the image photography and recording processing executed by the image capture apparatus. The processing described below with reference to the flow is executed under the control of the controller 117 in accordance with, for example, a program pre-stored in the ROM 118.

Processing in each step in the flowchart shown in FIG. 11 will now be described.

In step S101, a determination is made as to whether or not the shutter is pressed. When the shutter is not pressed, the process proceeds to step S102 in which a preview image is continuously displayed on the display section 121 of the image capture apparatus.

When it is determined in step S101 that the shutter is pressed and photography is executed, the process proceeds to step S103. In step S103, a determination is made as to whether or not the photographed image is a reference image. This determination processing is performed based on, for example, whether or not the photographed image is a first image photographed in a three-dimensional-image photography mode or a panoramic-image photography mode. For example, when the photographed image is a first image, the image is regarded as a reference image. In the processing example described above with reference to FIG. 10, the image 1 is a reference image. In the case of a multi-view camera, an image obtained via one of the lenses is used as a reference image.

When it is determined in step S103 that the photographed image is a reference image, the process proceeds to step S104 in which photography conditions and so on are saved and then the process proceeds to step S106. In step S103, photography conditions, such as auto exposure (AE), white balance (WB), shutter speed, and focus position, are temporarily saved to the RAM 119. The photography conditions for the first image that serves as a reference are used for photography of second and subsequent images, until the three-dimensional-image photography mode or the panoramic-image photography mode is finished. Use of the same photographic conditions makes it possible to eliminate the viewer's sense of discomfort during playback of a stereoscopic image.

When it is determined in step S103 that the photographed image is not a reference image, the process proceeds to step S105. In step S105, a newly photographed image is compared with the reference image and the amount of movement between the images is determined. This processing is performed using, for example, the inter-block matching of the motion detector 131 described above with reference to FIG. 9. When the image capture apparatus (camera) is a multi-view camera as described above with reference to FIG. 4, the amount of movement may be determined using a preset fixed value. When the image capture apparatus is equipped with hardware (e.g., an acceleration sensor) that can measure an amount of movement, information obtained by the hardware may also be used.

In step S106, the photographed images are saved to the storage section 115 and/or the external memory 116. The photographed images are saved in, for example, an MP format described above with reference to FIGS. 6 and 7. Although other formats, such as the Exif format, may also be used, it is preferable that the attribution information, such as the amount-of-movement information, be recorded in association with the photographed images.

In step S107, a determination is made as to whether or not the photography processing is completed. When the photography processing is not completed, the processing in step S101 and the subsequent steps is repeated. When it is determined in step S107 that the photography processing is completed, the processing ends.

As a result of the processing described above, images photographed from multiple viewpoints are stored in the storage section 115 and/or the external memory 116.

[3. Playback Processing of Photographed Image]

Figure 12:
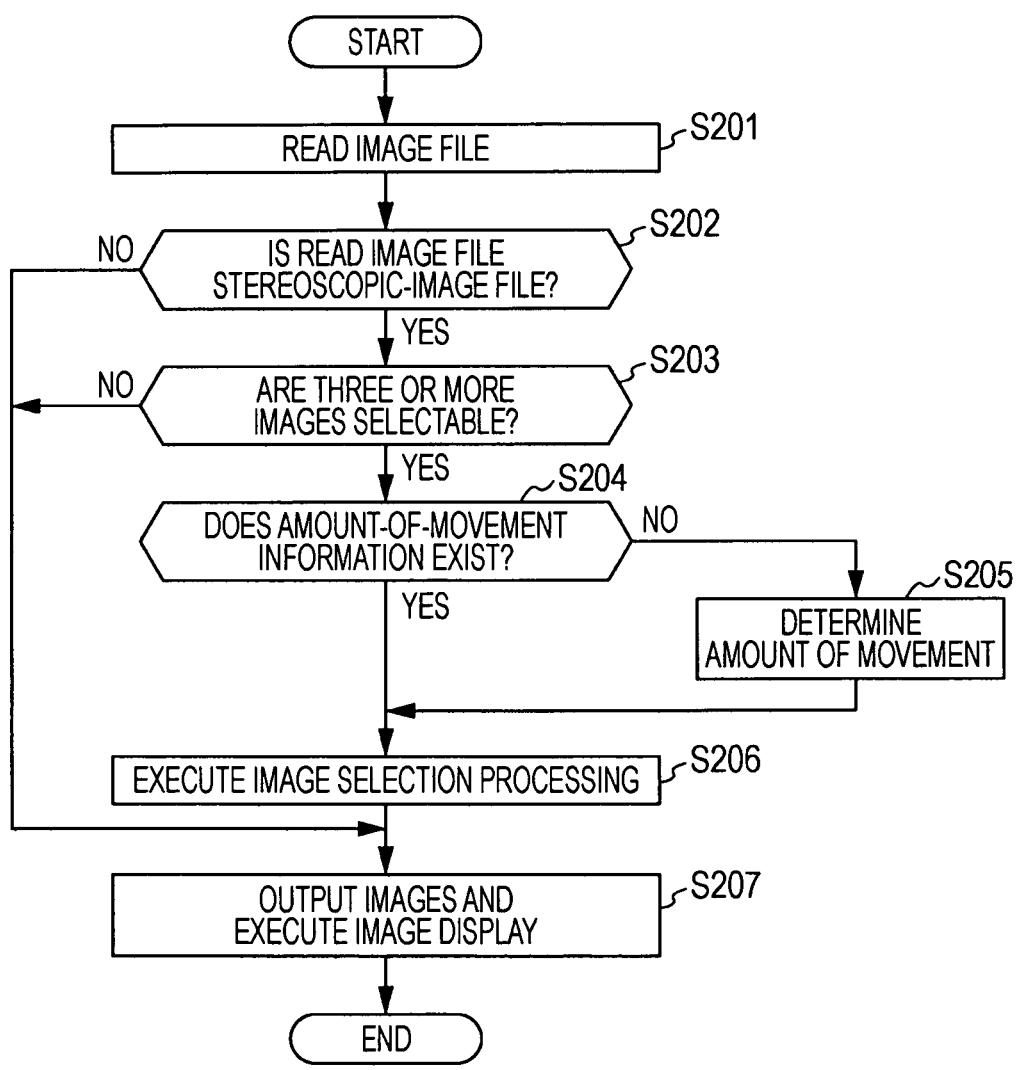
FIG. 12 is a flowchart illustrating a sequence of image-display processing executed by the image processing apparatus (the image capture apparatus) according to one embodiment of the present invention.

A playback processing of an image photographed and recorded by the image capture apparatus will be described next. FIG. 12 is a flowchart showing an overall sequence of image playback processing executed by the image capture apparatus.

First, in step S201, the controller 117 reads, from the storage section 115 or the external memory 116, an image file to be played back. In step S202, a determination is made as to whether or not the read image file is a file that can be used for displaying a stereoscopic image. This determination processing is performed based on, for example, attribute information of images. As described above with reference to FIG. 7, for example, the photography mode information indicating the stereoscopic-image photography mode, the panoramic-image photography mode, or the like is added to each photographed image. Thus, It is determined that an image to which the photography mode information is added is an image for which a set of multiple images with different viewpoints are recorded, and the determination in step S202 is YES.

When the attribute of the obtained image indicates a file of individually photographed image, not an image photographed in the stereoscopic-image photography mode, the panoramic-image photography mode, or the like, the determination in step S202 is NO. In this case, the process proceeds to step S207 in which processing for outputting and displaying the image as normal two-dimensional data is performed.

When the determination in step S202 is YES, the process proceeds to step S203. In step S203, a determination is made as to whether or not three or more images having different viewpoints are available for display as a stereoscopic image. When the number of images having different viewpoints is two or less, the determination is in step S203 is NO and the process proceeds to step S207. When the number of available images is only one, processing for outputting and displaying the image as normal two-dimensional data is performed. When the number of available images is two, the two images are used to display a stereoscopic image with one image for the left eye and the other image for the right eye.

When it is determined in step S203 that three or more images having different viewpoints for display as a stereoscopic image are available, image selection is allowed and thus processing in step S204 and the subsequent steps is executed for the image selection.

In step S204, a determination is made as to whether or not the amount-of-movement information is recorded as attribute information of the images. When the amount-of-movement information is not recoded, the process proceeds to step S205 in which an amount of movement between the images is determined. This processing is processing for comparing two images to determine an amount of movement between the images and is performed using, for example, the inter-block matching of the motion detector 131 described above with reference to FIG. 9.

When it is confirmed in step S204 that the amount-of-movement information for the images is recorded or when it is determined in step S205 that the determination of the amount of movement is completed, the process proceeds to step S206. In step S206, the amount-of-movement information is used to execute processing for selecting optimum images corresponding to the image display device and the viewer. Details of the processing are described below.

Lastly, in step S207, stereoscopic-image display using the selected two images having different viewpoints is executed.

A specific sequence of the image selection processing performed in step S206 will now be described with reference to a flowchart shown in FIG. 13.

In step S251, a determination is made as to whether the age of the viewer is less than a preset threshold age (e.g., 7 years old) or is more than or equal to the preset threshold age. This determination is made based on user input information.

Figure 14:
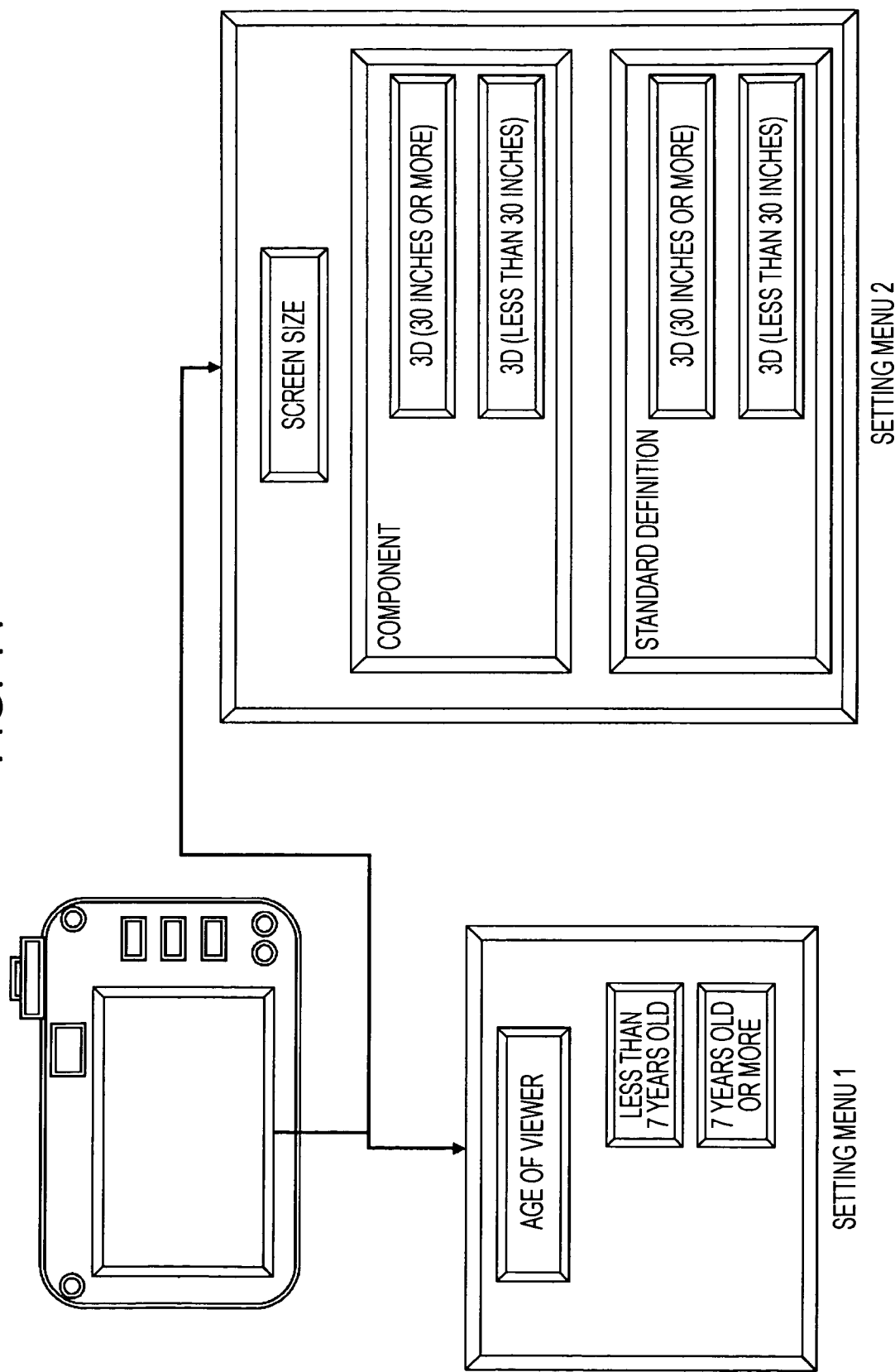
FIG. 14 illustrates a setting-information menu screen used in the image-selection processing executed by the image processing apparatus (the image capture apparatus) according to one embodiment of the present invention.

For example, as in a setting menu 1 shown in FIG. 14, a menu for inputting viewer information on the display section of the camera is displayed to query the user about his/her age, and a determination is made in accordance with user input information.

As described above, since long hours of continuous viewing of a stereoscopic image to appear closer to viewers may adversely affect young people such as children who are still growing, a safety guideline has been set. The determination processing in step S251 is also determination processing for performing image display according to the safety guideline.

When it is determined in step S251 that the age of the viewer is less than the preset threshold age (e.g., 7 years old), the process proceeds to step S253.

In step S253, a combination of two images having a small parallax, i.e., a small amount of movement, is selected from three or more images having different viewpoints, for use as the left-eye image and the right-eye image to be output to the display device. For example, when images 1 to 4 are available, the image 1 and the image 2, which has a smallest amount of movement (parallax) relative to the image 1, are selected. Alternatively, processing may be performed to determine amounts of movement between all of the images 1 to 4 and select a combination of images having a largest amount of movement not exceeding a preset maximum amount of movement.

On the other hand, when it is determined in step S251 that the age of the viewer is not less than the preset threshold age (e.g., 7 years old), the process proceeds to step S252.

In step S252, a determination is made as to whether or not the size of the display device for displaying the images is larger than or equal to a preset threshold size.

This determination processing is also performed based on, for example, user input information.

For example, as in a setting menu 2 shown in FIG. 14, a menu for inputting display-section information on the display section of the camera is displayed to query the user, and a determination is made in accordance with user input information. In the example shown in FIG. 14, the threshold is set to 30 inches and thus a determination is made as to whether or not the display device is 30 inches or more or is less than 30 inches.

When it is determined in step S252 that the size of the display device is larger than or equal to the threshold size, the process proceeds to step S253. In step S253, as described above, a combination of two images having a small parallax, i.e., a small amount of movement, is selected as the left-eye image and the right-eye image to be output to the display device.

On the other hand, when it is determined in step S252 that the size of the display device is smaller than the threshold size, the process proceeds to step S254. In step S254, a combination of two images having a large parallax, i.e., a large amount of movement, is selected as the left-eye image and the right-eye image to be output to the display device.

Figure 5:
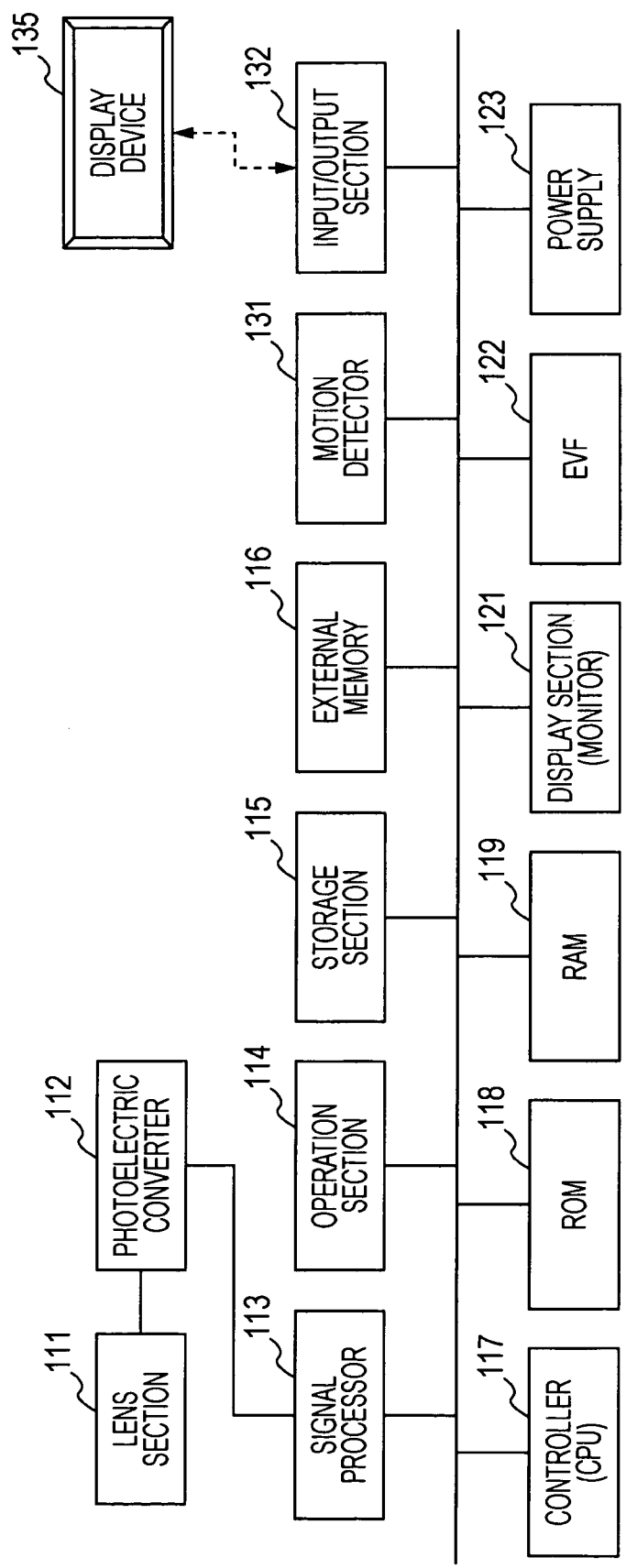
FIG. 5 is a block diagram illustrating an example of the hardware configuration of the image processing apparatus (the image capture apparatus) according to one embodiment of the present invention.

The display-device size information in step S252 may be determined based on, for example, display information (e.g., screen size information or HD (high-definition) image display capability/incapability information) obtained from the external display device 135 connected via the input/output section 132 shown in FIG. 5, without use of the user information input on the menu screen shown in FIG. 14. For example, when the display device can display an HD image, it is determined that the screen size is large. For example, when the display device has an HDMI-cable connection configuration, a maximum horizontal/vertical image size can be obtained from EDID (extended display identification data) as image-size information. When the display device has a component-cable connection configuration, it is possible to obtain the HD-image display capability/incapability information. For example, when a 3D image is displayed, it is also possible to determine that the screen size is large.

The arrangement may also be such that the viewer-age determination processing in step S251 does not use the user input information. For example, the age determination processing may also be performed by photographing a viewer with a camera equipped in the display device, performing face detection processing on the photographed image, and using a detected face image. In this case, a program for executing the face detection processing and face-image-based age-determination processing is pre-stored in the storage section 115 in the image capture apparatus and the processing is executed based on the program.

Figure 13:
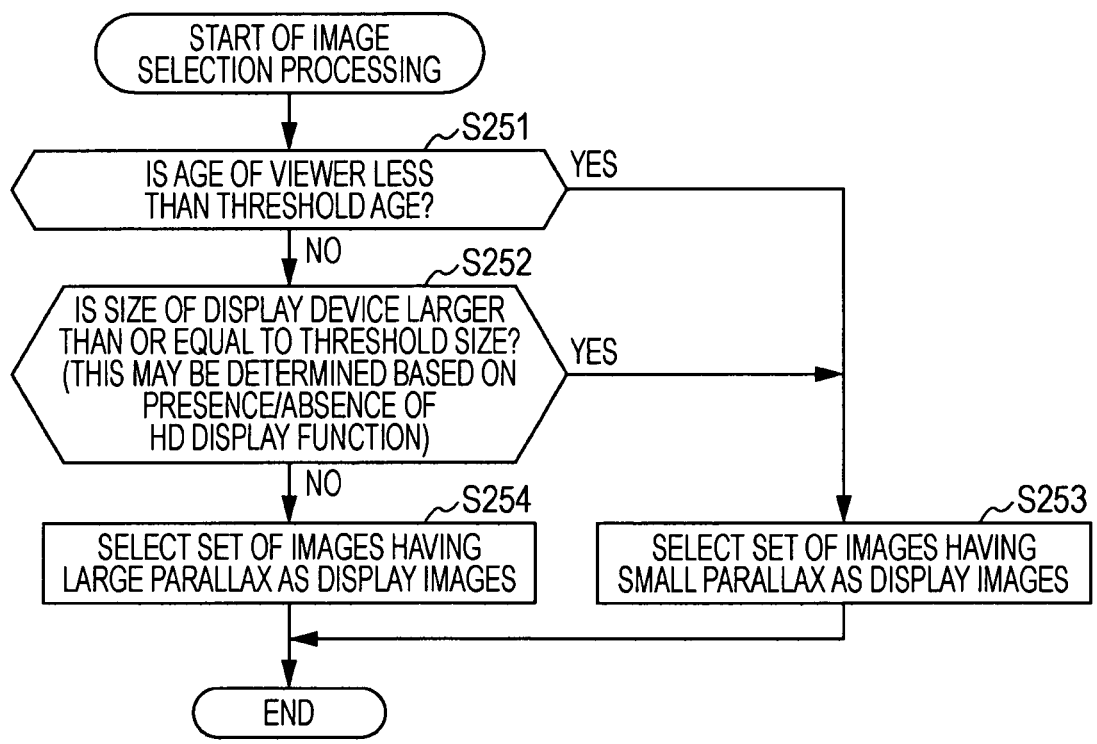
FIG. 13 is a flowchart illustrating a sequence of image-selection processing in the image display processing executed by the image processing apparatus (the image capture apparatus) according to one embodiment of the present invention.

Performing the image-selection processing according to the flowchart shown in FIG. 13 makes it possible to present a young viewer with a stereoscopic image that does not have too large parallax.

It is also possible to display an optimum stereoscopic image corresponding to the screen size.

Figure 15:
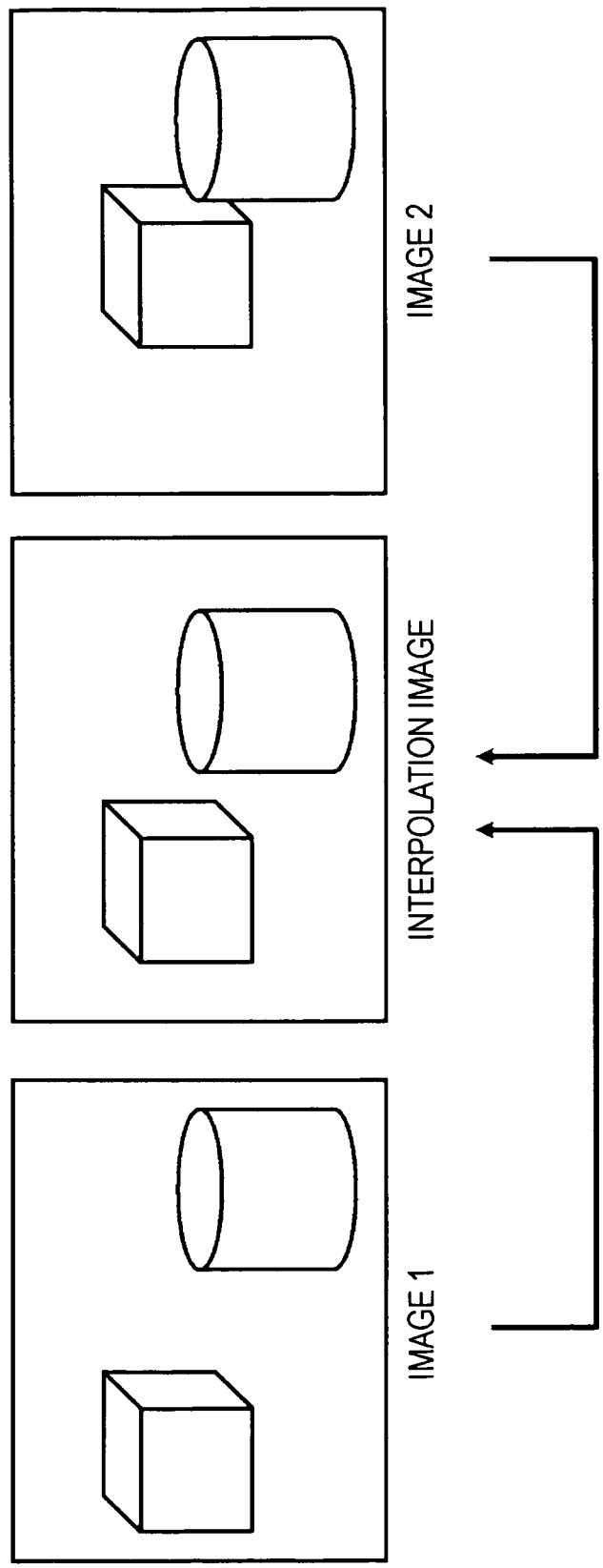
FIG. 15 illustrates image interpolation processing executed by the image processing apparatus (the image capture apparatus) according to one embodiment of the present invention.

When images having a parallax that is suitable for display are not available in step S253 or S254, interpolation-image creation processing may be executed to process existing images to create a new interpolation image for use as a display image. For example, as shown in FIG. 15, in the presence of images 1 and 2, when the amount of movement (parallax) between the image 1 and the image 2 is large, interpolation processing using the images 1 and 2 is performed to create an interpolation image. The parallax between the image 1 and the interpolation image is half the parallax between the image 1 and the image 2. Such an interpolation image may also be used in the display processing.

For example, when the external display device 135 is connected to the image capture apparatus via the input/output section 132 shown in FIG. 5, an image can be displayed on both of the display section (monitor) 121 of the image capture apparatus and the connected display device 135 as a result of the image display processing. In this case, when the external display device 135 is connected via the input/output section 132, the external display device 135 having a large display size is preferentially selected for display. In this case, the same stereoscopic image as an image displayed on the externally connected display device 135 may be displayed on the display section 121 of the image capture apparatus. Alternatively, for example, as shown in FIG. 16, text indicating "being output on TV" or the like may be displayed on the display section 121 of the image capture apparatus.

Figure 17:
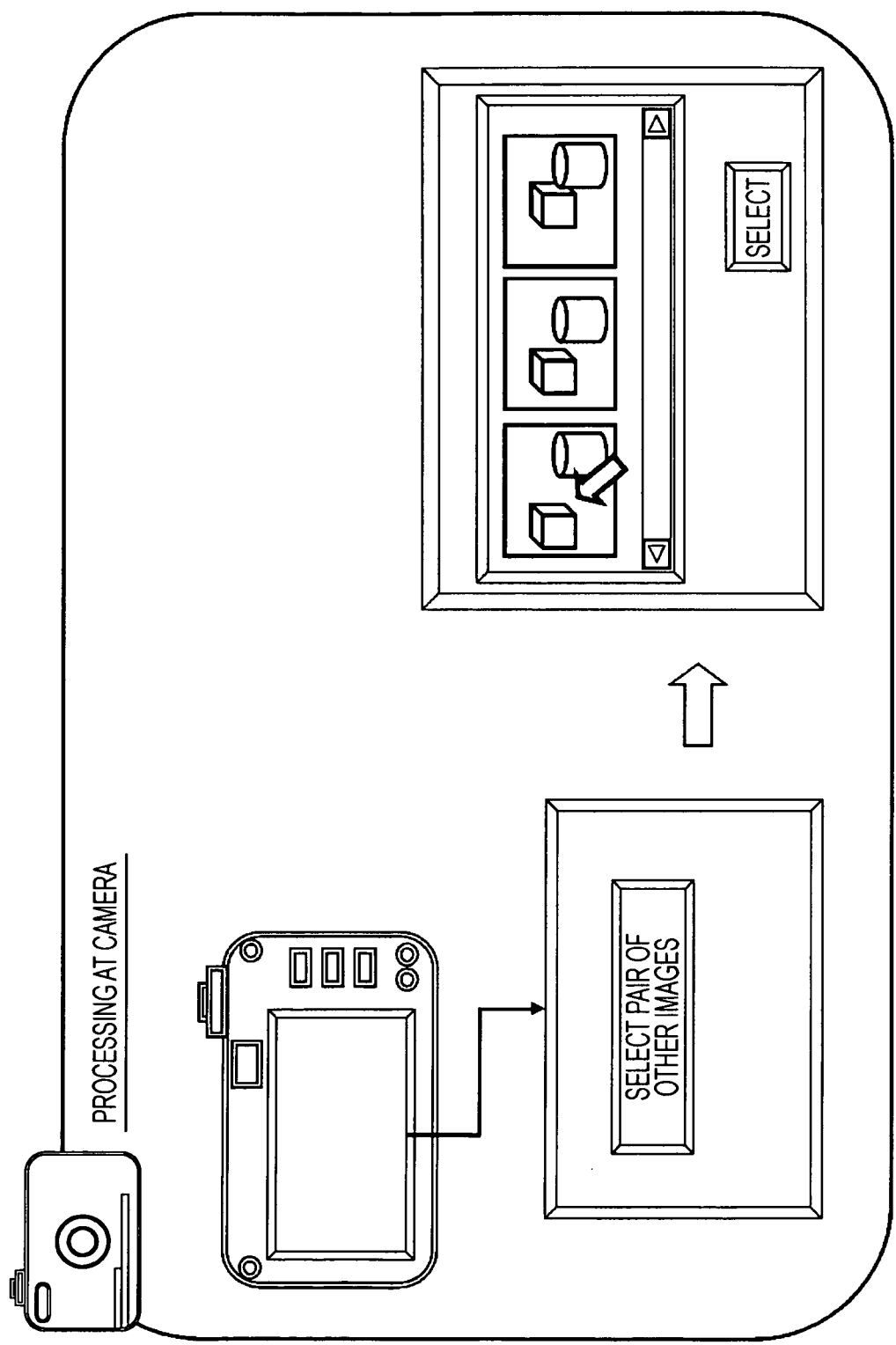
FIG. 17 illustrates image-selection processing for a user, the processing being executed by the image processing apparatus (the image capture apparatus) according to one embodiment of the present invention.

In the image-selection processing in the flow shown in FIG. 13, only a specific pair of images is selected and the user is not allowed to select any image. In contrast, however, a screen for execution of image selection, as shown in FIG. 17, may be presented so that the user can select an arbitrary pair of images.

[4. Example of Image Output Processing corresponding to Function of Connected Display Device]

The external display device 135 connected to the image capture apparatus via the input/output section 132 shown in FIG. 5 may be any display device. The external display device 135 may also have any functions.

Examples of the external display device 135 include:

(a) a display device that can display a stereoscopic image and that does not allow for image selection;

(b) a display device that can perform stereoscopic-image display and image selection and that does not interpret an MP file; and (c) a display device that can perform stereoscopic-image display, interpretation of an MP file, and image selection.

The image capture apparatus executes different processing depending on the function of the display device connected via the input/output section 132. Processing that the image display apparatus executes depending on the function of the connected display device will now be described with reference to a flowchart shown in FIG. 18.

Figure 18:
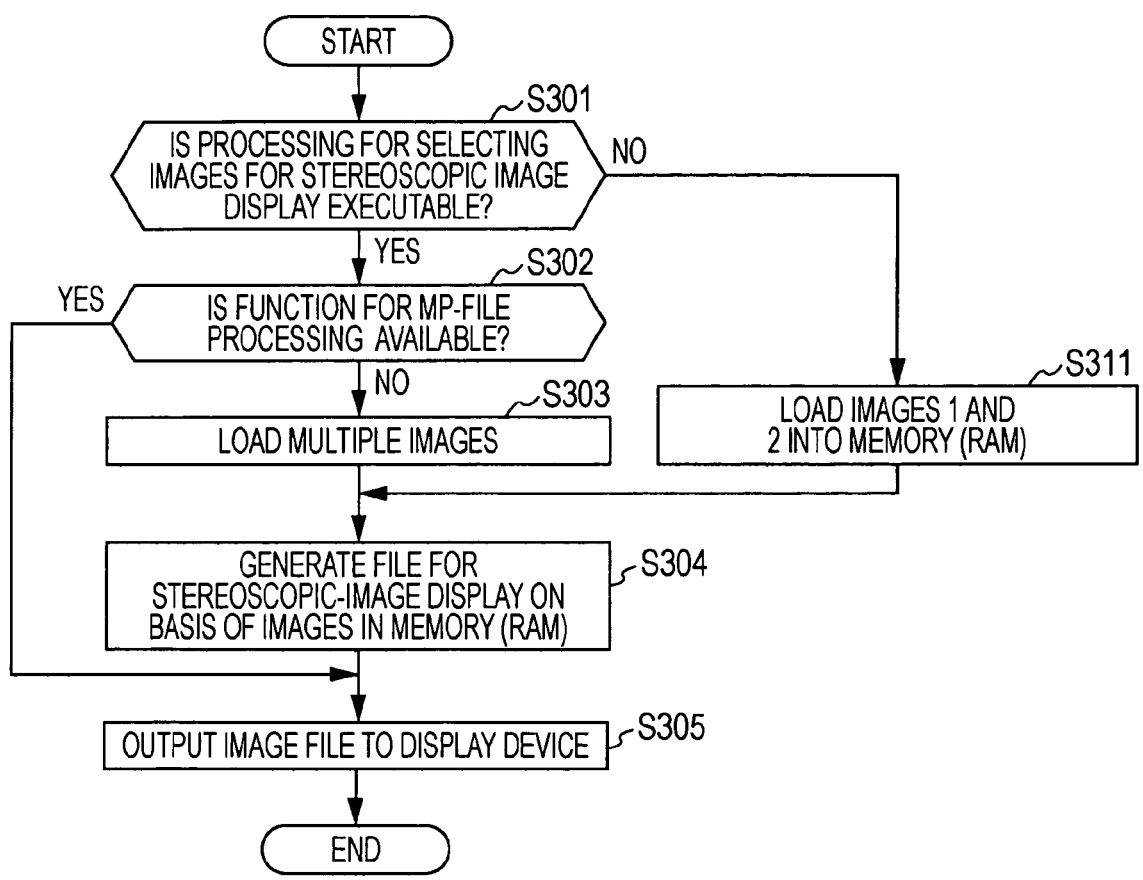
FIG. 18 is a flowchart illustrating control processing for the external display device, the control processing being executed by the image processing apparatus (the image capture apparatus) according to one embodiment of the present invention.

The flow shown in FIG. 18 is executed using connected-display-device information input via the input/output section 132 or using display-device information input by the user.

First, in step S301, a determination is made as to whether or not the connected display device has a function for executing processing for selecting images for stereoscopic-image display. When the display apparatus lacks the selection function, the process proceeds to step S311 in which the image capture apparatus executes image-selection processing and loads selected images into the memory (RAM). The image-selection processing in this case is executed in accordance with, for example, the flow described above with reference to FIG. 13.

On the other hand, when it is determined in step S301 that the connected display device has a function for executing processing for selecting images for stereoscopic-image display, the process proceeds to step S302.

In step S302, a determination is made as to whether or not the connected display device can interpret and process an MP file (see FIGS. 6 and 7).

When the connected display device has the function for MP-file interpretation processing, the process proceeds to step S305 in which the MP file is directly output to the display device. Thereafter, the processing ends. In this case, the display device executes processing for selecting and displaying images.

When it is determined in step S302 that the connected display device lacks the function for MP-file interpretation processing, the process proceeds to step S303.

In step S303, multiple images for stereoscopic-image display are loaded into the memory (RAM).

After the processing in step S303 or the processing in step S311 is finished, the process proceeds to step S304.

In step S304, images corresponding to the stereoscopic-image display system of the display device to which an image file is to be output are created from the file in the memory (RAM).

As the stereoscopic-image display system, there are various systems, such as a liquid-crystal shutter system, a polarized-glasses system, and a parallax barrier system. As the format of presenting data of left and right images, there are various formats, such as side-by-side, over-under, and interlace formats. In step S304, data for output is generated in accordance with a system that can be handled by the display device.

Thereafter, in step S305, the generated image file is output to the display device.

Figure 19:
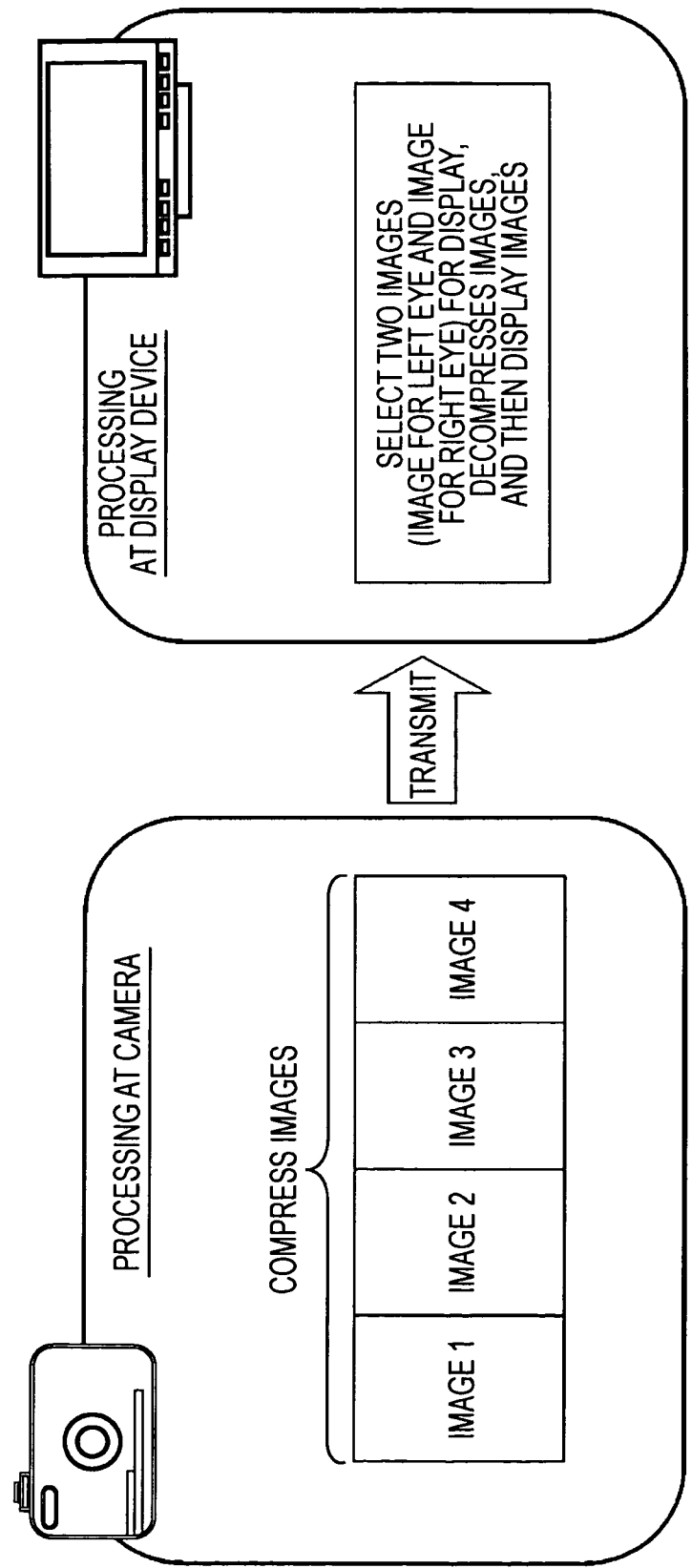
FIG. 19 illustrates an example of processing for outputting data to the external display device, the processing being executed by the image processing apparatus (the image capture apparatus) according to one embodiment of the present invention.

In such a manner, the image capture apparatus performs image presentation processing corresponding to the function of the connected external display device. When an image file including multiple images is to be output to the display device, for example, it is desirable to employ, a configuration in which a compressed file is generated as shown in FIG. 19 and is transmitted to the display device.

[5. Embodiment of Amount-of-Movement Determination through Image Comparison Processing]

As described above with reference to FIG. 9, during determination of an amount of movement (parallax) between images that were photographed from different viewpoints and that are usable for display of a stereoscopic image, the motion detector 131 (see FIG. 5) divides each of the images into blocks and executes block matching to determine the amount of movement.

Detailed processing of a sequence of optimum image selection through the amount-of-movement determination processing will now be described with reference to flowcharts shown in FIGS. 20 and 21.

Figure 22:
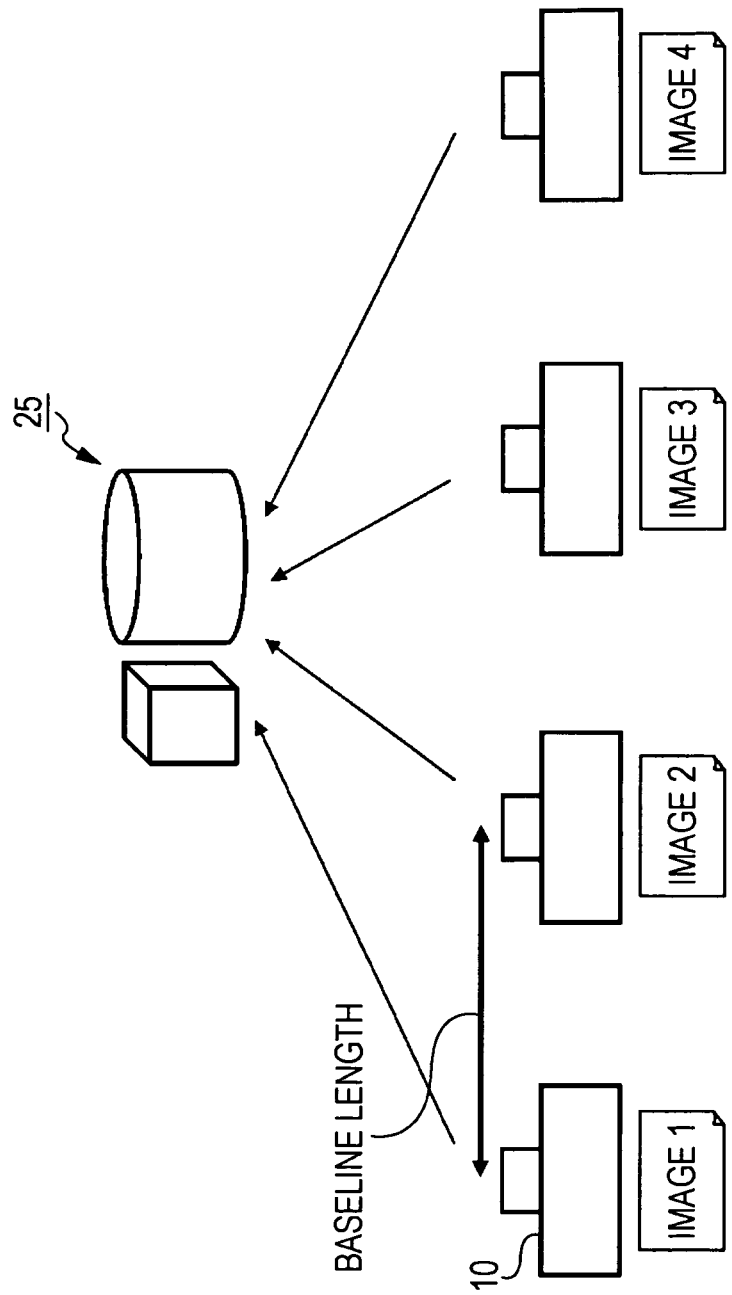
FIG. 22 illustrates a baseline length.

In step S501, a determination is made as to whether or not baseline-length information is recorded in the MP file (see FIGS. 6 and 7). As shown in FIG. 22, the baseline-length information is information indicating a distance between lenses via which the images are photographed and corresponds to the amount-of-movement information. When the baseline-length information (the amount-of-movement information) is recorded in the MP file (YES in step S501), the process proceeds to step S511 in which processing using the baseline-length information is performed.

On the other hand, when the baseline-length information is not recorded in the MP file (see FIGS. 6 and 7), the result of the determination in step S501 is NO and the process proceeds to step S502.

In step S502, a reference image is obtained. The reference image is one of images used for stereoscopic-image display.

Next, in step S503, a comparison image is obtained. The comparison image is an image other than the reference image.

In step S504, the reference image and the comparison image are converted into images including only luminance (Y) information and each of the images is divided into blocks. The conversion into the luminance information is processing aimed to reduce the amount of information in order to efficiently execute block comparison processing. Thus, for example, when the image capture apparatus has a sufficient function for data processing, RGB values may be directly used. In such a case, the processing (in step S504) for converting the images into the images including only luminance (Y) information may be eliminated. The number of blocks resulting from the image division may be set to any number. One example of the divided image is shown in FIG. 23B. The image shown in FIG. 23B is an example obtained by dividing an image shown in FIG. 23A into 64×48 blocks.

In step S505, an average value of luminances (Y) in the divided blocks is determined with respect to each of the reference image and the comparison image.

Next, in step S506, processing blocks are sequentially selected from the comparison image and a determination is made as to whether or not a block having a luminance that is the same as the average luminance of the selected processing block or a block having an average luminance that is within a preset difference exists in the reference image. When multiple blocks each having an average luminance that is within the preset difference exist in the reference image, one block having the smallest difference is selected.

During the block search processing, all blocks in the reference image may be searched as a search range, or processing using only some blocks in the reference image as a search range may be performed as shown in FIG. 23C. In the example shown in FIG. 23C, only blocks (x to y in a reference image R1 in FIG. 23C) in a preset search range are searched using, as a starting point, a block in the reference image R1 at a position corresponding to a block in a comparison image C1.

In step S507, when a block having a luminance that is the same as the average luminance of the block selected from the comparison image or a block having an average luminance that is within a preset difference is detected from the reference image, the process proceeds to step S508. Otherwise, the process proceeds to step S509.

In step S508, the amount of movement between the block selected from the comparison image and the block detected from the reference image is recorded and a count value of a matched-block counter is updated.

In step S509, a count value of a mismatched-block counter is updated.

In step S510, a determination is made as to whether or not the processing is completed with respect to all blocks included in the comparison image. When any unprocessed block exists, processing in step S506 and the subsequent steps is executed on the unprocessed block.

When it is determined in step S510 that the processing is completed with respect to all blocks, the process proceeds to step S512.

A flow shown in FIG. 21 will be described next.

Step S511 is performed when it is determined in step S501 that the baseline length is recorded in the MP file.

In step S511, an amount of movement between the images is determined based on the baseline length.

On the other hand, when the baseline length is not recorded in the MP file, the process proceeds to step S512 in which an amount of movement between the images is determined based on the amounts of block movement, the amounts being obtained as a result of the processing in steps S502 to S510. An average value of the amounts of block movement, the amounts being obtained as a result of the processing in steps S502 to S510, is set as the amount of movement between the images.

For example, the processing in steps S502 to S510 can yield, for example, results as follows:

Amount of Movement between Image 1 and Image 2=1 Block

Amount of Movement between Image 1 and Image 3=2 Blocks

Amount of Movement between Image 1 and Image 4=6 Blocks

In step S513, a determination is made as to whether or not the image output destination is the external display device connected to the image capture apparatus or the display section (monitor) of the image capture apparatus.

When the output destination is the display section of the image capture apparatus, the process proceeds to step S517 in which a pair of images having a large amount of movement is selected as an image for the left eye and an image for the right eye. For example, the images 1 and 3 are selected. For the image selection, it is preferable to employ a configuration in which an allowable maximum value and an allowable minimum value for the amount of movement are predetermined so that a pair of images in the range of the values is selected.

When it is determined in step S513 that the image output destination is the external display device connected to the image capture apparatus, the process proceeds to step S514 in which the display device information is obtained from the connected display device (e.g., through use of EDID). In step S515, a determination is made as to whether or not the screen size of the display device is larger than or equal to a preset threshold size (e.g., 30 inches).

When the screen size of the display device is larger than or equal to the preset threshold size (e.g., 30 inches), the process proceeds to step S516. On the other hand, when the screen size of the display device is smaller than the preset threshold size (e.g., 30 inches), the process proceeds to step S517.

When it is determined in step S515 that the screen size of the display device is larger than or equal to the threshold and the process proceeds to step S516, a pair of images having a small amount of movement is selected as an image for the left eye and an image for the right eye. For example, the images 1 and 2 are selected. For the image selection, it is also preferable to employ a configuration in which an allowable maximum value and an allowable minimum value for the amount of movement are predetermined so that a pair of images in the range of the values is selected.

On the other hand, when it is determined in step S515 that the screen size of the display device is smaller than the threshold and the process proceeds to step S517, a pair of images having a large amount of movement is selected as an image for the left eye and an image for the right eye. For example, the images 1 and 3 are selected.

After the processing in step S516 or the processing in step S517 is finished, the process proceeds to step S518. In step S518, an image for stereoscopic display is created on the basis of the selected images and the created image is output on the display section.

Figure 20:
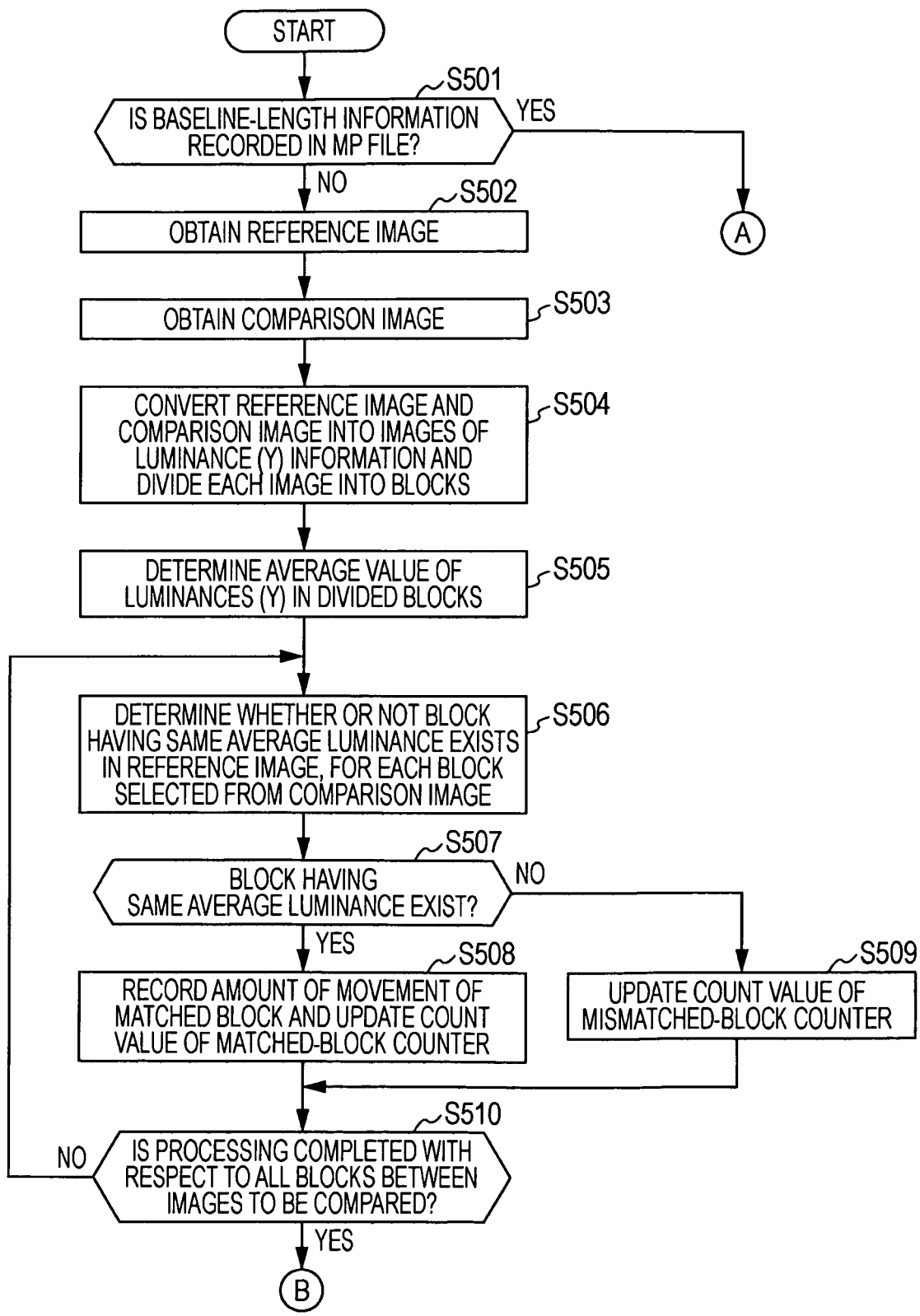
FIG. 20 is a flowchart illustrating amount-of-movement determination and control processing for the external display device, the determination and the control processing being executed by the image processing apparatus (the image capture apparatus) according to one embodiment of the present invention.
Figure 21:
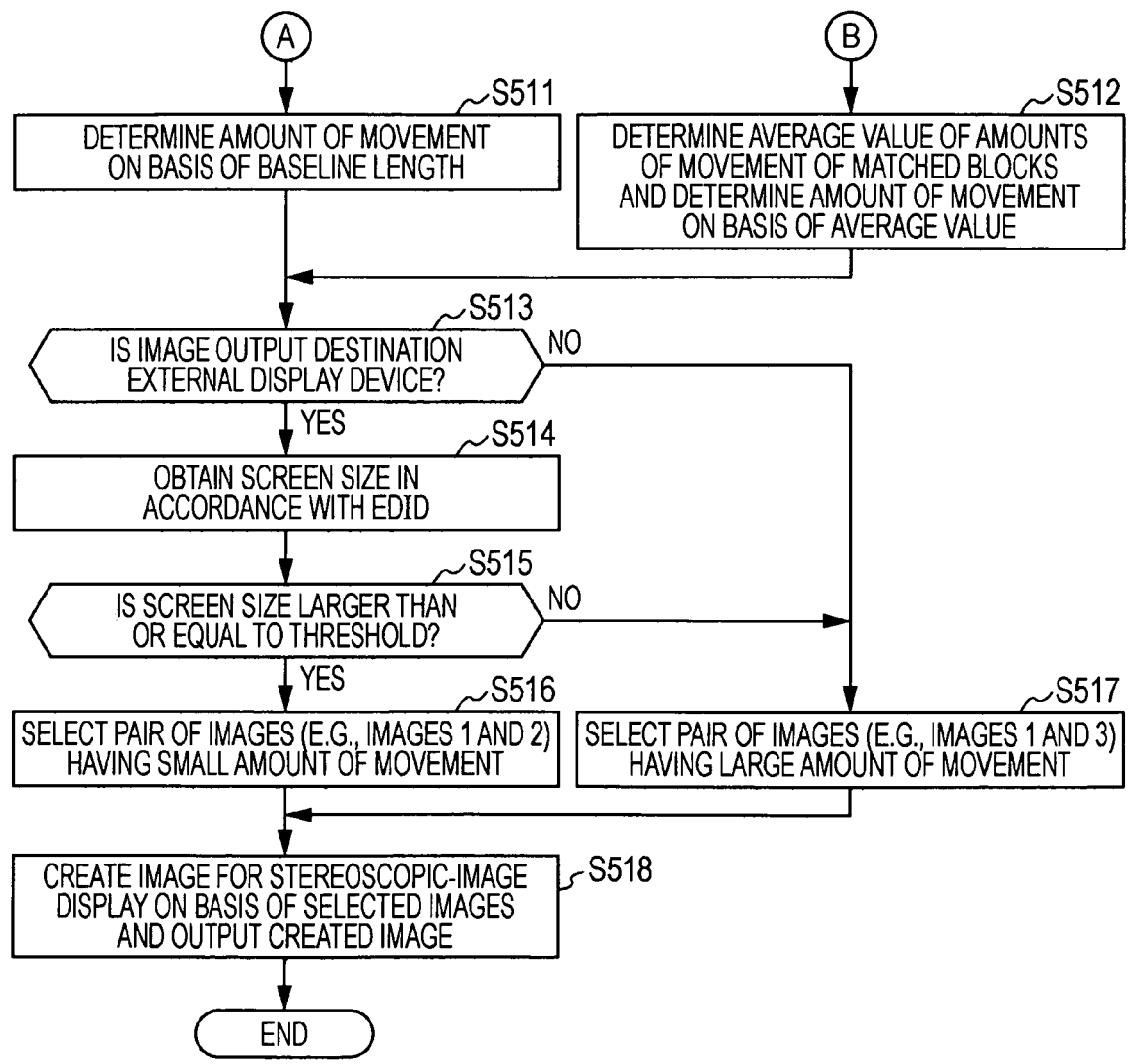
FIG. 21 is a flowchart illustrating the amount-of-movement determination and the control processing for the external display device, the determination and the control processing being executed by the image processing apparatus (the image capture apparatus) according to one embodiment of the present invention.

Although the image-selection processing based on the age of the viewer is omitted in the flows shown in FIGS. 20 and 21, the viewer-age-based image-selection processing described above with reference to FIG. 13 may also be executed in conjunction with the above-described processing.

As described above, the image processing apparatus (e.g., the image capture apparatus) according to the embodiment of the present invention selectively displays a pair of images having a small amount of movement (parallax) when the display size of the display device on which a stereoscopic image, i.e., a three-dimensional image, is to be displayed is large, and selectively displays a pair of images having a large amount of movement (parallax) when the display size of the display device is small.

When the age of the viewer is low, the image processing apparatus selectively displays a pair of images having a small amount of movement (parallax).

Through execution of the processing described above, an optimum stereoscopic-image display corresponding to the display device and the viewer is realized.

Although the above description has been given of a case in which two pairs of images, i.e., a pair of images having a small amount of movement and a pair of images having a large amount of movement, are selected based on whether the display size is larger than or equal to the single threshold size or is smaller than the threshold size, the arrangement may also be such that multiple thresholds are set and pairs of images having different amounts of movement (parallaxes) are selected as display images.

Two threshold sizes Tha and Thb (Tha>Thb) are set by way of example.

For example, for the display size≥Tha, a pair of images having an amount of movement (parallax) of m1 to m2 is selected; for Tha>the display size≥Thb, a pair of mages having an amount of movement (parallax) of m2 to m3 is selected; and for Thb>the display size, a pair of images having an amount of movement (parallax) of m3 to m4 is selected.

In this case, the amounts of movement (parallaxes), m1 to m4, satisfy m1<m2<m3<m4.

In addition, three or more thresholds may be set so that the image-pair selection can be performed with finer setting.

This is also applicable to viewer-age-based image selection. That is, multiple thresholds may further be set so that a pair of images having multiple different amounts of movement is selected.

Two threshold ages Thx and Thy (Thx<Thy) are set by way of example.

For example, for the age of the viewer<Thx, a pair of images having an amount of movement (parallax) of mp to mq is selected; for Thx<the age of the viewer≥Thy, a pair of mages having an amount of movement (parallax) of mq to mr is selected; and for Thy<the age of the viewer, a pair of images having an amount of movement (parallax) of mr to ms is selected.

In this case, the amounts of movement (parallaxes), mp to ms, satisfy mp<mq<mr<ms.

In addition, three or more thresholds may be set so that the image-pair selection can be performed with finer setting.

Although stereoscopic display of images photographed by the image capture apparatus has been described in the above embodiment, the present invention is not limited thereto. For example, for display of a menu screen and/or OSD (on screen display) information, the arrangement may also be such that multiple images for stereoscopic-display are pre-stored in the memory and a combination of images having a different parallax is selected and displayed in accordance with the display size and/or the age of the viewer. With respect to a criterion for selecting the parallax, when the display size of the display device is large, a pair of images having a small parallax is selected, and when the display size of the display device is small, a pair of images having a large parallax is selected, as in the above-described image display. When the age of the viewer is low, the image processing apparatus selectively displays a pair of images having a small parallax. Through execution of the processing described above, an optimum stereoscopic-image display corresponding to the display device and the viewer is also realized with respect to the menu screen and/or the OSD information.

The present invention has been detailed above in conjunction with the particular embodiments. It is, however, apparent to those skilled in the art that modifications and substitutions can be made to the embodiments without departing from the spirit and scope of the present invention. That is, the present invention has been disclosed above by way of example and thus should not be construed as limiting. The claims of the present invention should also be taken into account in order to determine the spirit and scope of the present invention.

The series of processing described hereinabove can be executed by hardware, software, or a combination thereof. When the series of processing is to be executed by software, a program in which the processing sequence is written can be executed through loading into a memory in a computer incorporated in dedicated hardware or through installation onto a general-purpose computer that is capable of executing various types of processing. For example, the program can be pre-recorded to a storage medium. The program may be installed from the storage medium onto a computer. Alternatively, the program can be installed on a storage medium, such as a built-in hard disk, through reception of the program over a network, such as a LAN (local area network) or the Internet.

The various types of processing described hereinabove may not only be time-sequentially executed according to the above-described sequence but may also be executed in parallel or individually depending on a processing capability of an apparatus that executes the processing or depending on the necessity. The term "computer system" as used herein refers to a logical collection of multiple apparatuses (devices) and is not limited to an architecture in which apparatuses (devices) having individual configurations are provided in a single housing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a controller that selects, from multiple images photographed from different viewpoints, display images to be used for processing for displaying a three-dimensional image, the controller being configured to execute processing for selecting, as the display images, a set of images having a different parallax in accordance with a display size of a display section, in which the controller:
determines whether or not amount-of-movement information corresponding to a parallax between the images is recorded as attribute information of the images,
selects, when the amount-of-movement information is recorded, a combination of images having a parallax corresponding to the display size of the display section using the recorded amount-of-movement information, and
selects, when the amount-of-movement information is not recorded, a combination of images having a parallax corresponding to the display size of the display section by determining an amount of movement through use of information resulting from determination of degrees of block matching between images divided into blocks and using information of the determined amount of movement,
wherein respective average values of luminances are determined for each block of a reference image and for each block of a comparison image,
wherein for each block within at least a region of the comparison image, whether that selected block has a same average luminance as the average luminance of one of the blocks of the reference image only within a preset search range or has an average luminance within a preset difference from the average luminance of one of the blocks of the reference image only within the preset search range is determined, in which the preset search range includes only blocks within a predetermined pattern which starts at a respective block in the reference image which corresponds to the currently selected block of the comparison image and in which a number of blocks within the preset search range is less than a total number of blocks within the reference image, and
wherein when a given one of the blocks of the comparison image has an average luminance that is the same as the average luminance of a particular one of the blocks of the reference image or has an average luminance with a smallest difference from the average luminance of a particular one of the blocks of the reference image from among one or more blocks of the comparison image having an average luminance within the preset difference, the given block of the comparison image and the particular block of the reference image are used to determine the amount of movement.

2. The image processing apparatus according to claim 1, further comprising a motion detector that executes processing for determining the degrees of the block matching between the images divided into the blocks; wherein the controller determines the amount of movement by using information of detection performed by the motion detector.

3. The image processing apparatus according to claim 1 or 2, wherein the controller obtains age information of a viewer, compares the obtained age information with a preset threshold age, and executes processing for selecting a combination of images having a parallax that differs between when the age of the viewer is less than the threshold age and when the age of the viewer is more than or equal to the threshold age.

4. The image processing apparatus according to claim 1, wherein in response to the display section having a large display size, the controller performs processing for selecting a combination of images having a smaller parallax than a parallax between images selected in response to the display section having a small display size.

5. The image processing apparatus according to claim 3, wherein, when the age of the viewer is less than the threshold age, the controller performs processing for selecting a combination of images having a smaller parallax than a parallax selected when the age of the viewer is more than or equal to the threshold age.

6. The image processing apparatus according to claim 1, wherein the controller obtains the display size by analyzing display device information input from an external display device connected to the image processing apparatus.

7. The image processing apparatus according to claim 1, wherein, when the amount-of-movement information corresponding to the parallax between the images is not recorded as the attribute information of the images, the controller converts the images into images having luminance information and executes the block-matching-degree determination processing by using the images having the luminance information.

8. The image processing apparatus according to claim 1, wherein the image processing apparatus comprises an image capture apparatus having a function for photography images, and the controller performs processing for recording, as attribute information of the photographed images, amount-of-movement information that is parallax information for the photographed images.

9. The image processing apparatus according to claim 8, further comprising a motion detector that executes processing for determining the degrees of the block matching between the images divided into the blocks; wherein the controller determines the amount of movement by using information of detection performed by the motion detector and records the determined amount of movement as the attribute information of the images.

10. The image processing apparatus according to claim 1, in which the predetermined pattern represents a predetermined sequential order of a plurality of blocks in both a horizontal direction and a vertical direction.

11. The image processing apparatus according to claim 10, in which the predetermined sequential order of the predetermined pattern starts at the respective block in the reference image and initially moves in the horizontal direction for a plurality of blocks, then moves in the vertical direction to a new row of blocks, then moves in the horizontal direction for a plurality of blocks, then moves in the vertical direction to another row of blocks, and then moves in the horizontal direction for a plurality of blocks.

12. An image processing method executed by an image processing apparatus, the method comprising:
causing a controller to select, from multiple images photographed from different viewpoints, display images to be used for processing for displaying a three-dimensional image; the image selecting step including:

executing processing for selecting, as the display images, a set of images having a different parallax in accordance with a display size of a display section, including:

determining whether or not amount-of-movement information corresponding to a parallax between the images is recorded as attribute information of the images, selecting, when the amount-of-movement information is recorded, a combination of images having a parallax corresponding to the display size of the display section using the recorded amount-of-movement information, and selecting, when the amount-of-movement information is not recorded, a combination of images having a parallax corresponding to the display size of the display section by determining an amount of movement through use of information resulting from determination of degrees of block matching between images divided into blocks and using information of the determined amount of movement, wherein respective average values of luminances are determined for each block of a reference image and for each block of a comparison image, wherein for each block within at least a region of the comparison image, whether that selected block has a same average luminance as the average luminance of one of the blocks of the reference image only within a preset search range or has an average luminance within a preset difference from the average luminance of one of the blocks of the reference image only within the preset search range is determined, in which the preset search range includes only blocks within a predetermined pattern which starts at a respective block in the reference image which corresponds to the currently selected block of the comparison image and in which a number of blocks within the preset search range is less than a total number of blocks within the reference image, and wherein when a given one of the blocks of the comparison image has an average luminance that is the same as the average luminance of a particular one of the blocks of the reference image or has an average luminance with a smallest difference from the average luminance of a particular one of the blocks of the reference image from among one or more blocks of the comparison image having an average luminance within the preset difference, the given block of the comparison image and the particular block of the reference image are used to determine the amount of movement.

13. A non-transitory recording medium having recorded therein a computer program for causing an image processing apparatus to execute image processing, the program comprising:

causing a controller to select, from multiple images photographed from different viewpoints, display images to be used for processing for displaying a three-dimensional image;

the image selecting step including:

executing processing for selecting, as the display images, a set of images having a different parallax in accordance with a display size of a display section, including:

determining whether or not amount-of-movement information corresponding to a parallax between the images is recorded as attribute information of the images, selecting, when the amount-of-movement information is recorded, a combination of images having a parallax corresponding to the display size of the display section using the recorded amount-of-movement information, and selecting, when the amount-of-movement information is not recorded, a combination of images having a parallax corresponding to the display size of the display section by determining an amount of movement through use of information resulting from determination of degrees of block matching between images divided into blocks and using information of the determined amount of movement, wherein respective average values of luminances are determined for each block of a reference image and for each block of a comparison image, wherein for each block within at least a region of the comparison image, whether that selected block has a same average luminance as the average luminance of one of the blocks of the reference image only within a preset search range or has an average luminance within a preset difference from the average luminance of one of the blocks of the reference image only within the preset search range is determined, in which the preset search range includes only blocks within a predetermined pattern which starts at a respective block in the reference image which corresponds to the currently selected block of the comparison image and in which a number of blocks within the preset search range is less than a total number of blocks within the reference image, and wherein when a given one of the blocks of the comparison image has an average luminance that is the same as the average luminance of a particular one of the blocks of the reference image or has an average luminance with a smallest difference from the average luminance of a particular one of the blocks of the reference image from among one or more blocks of the comparison image having an average luminance within the preset difference, the given block of the comparison image and the particular block of the reference image are used to determine the amount of movement.

* * * * *